United States Patent [19]
Habib et al.

[11] Patent Number: 5,694,610
[45] Date of Patent: Dec. 2, 1997

[54] METHOD AND SYSTEM FOR EDITING AND FORMATTING DATA IN A DIALOG WINDOW

[75] Inventors: Catherine L. Habib, Redmond; Steven Bush, Issaquah, both of Wash.

[73] Assignee: Microsoft Corporation, Redmond, Wash.

[21] Appl. No.: 696,803

[22] Filed: Aug. 14, 1996

Related U.S. Application Data

[63] Continuation of Ser. No. 299,938, Sep. 1, 1994, Pat. No. 5,579,466.
[51] Int. Cl.$^6$ .................................................. G06F 17/24
[52] U.S. Cl. .................................. 395/793; 395/347
[58] Field of Search ........................ 395/793, 792, 395/791, 802, 803, 347, 340, 352, 761; 358/402

[56] References Cited

U.S. PATENT DOCUMENTS

| | | | |
|---|---|---|---|
| 5,392,386 | 2/1995 | Chalas | 395/155 |
| 5,579,466 | 11/1996 | Habib et al. | 395/793 |

OTHER PUBLICATIONS

Microsoft Mail for Windows Version 3.2a, 1992–1994, sample screen printouts., 1994.
*Microsoft Word for Windows User's Guide*, Version 2.0, pp. 140–145, 491–492, Microsoft Corporation, 1991.
Heller, Martin, *Advanced Windows™ Programming*, John Wiley & Sons, Inc., New York, NY, Chapter 7, pp. 265–282, Chapter 8, pp. 283–312, 1992.
Simpson, Alan, *Mastering WordPerfect 5.1 & 5.2 for Windows*, Sybex, 1992, 1993.
Massimo, Casaro, Advanced Windows Programming, *Windows–DOS Developer's Journal*, Oct. 1993, vol. 4, No. 10, pp. 21(4).

*Primary Examiner*—Joseph H. Feild
*Attorney, Agent, or Firm*—Jones & Askew, LLP

[57] ABSTRACT

A method and system for editing and formatting data in a dialog window. A rich text edit control supports a rich text edit field in a user dialog. Different behaviors can be specified for the rich text edit control such that a dialog author can enable or disable the formatting capability of the rich text edit field. A user can type directly into the rich text edit field and select and modify the formatting characteristics of entered data using the same techniques and mechanisms provided to enter data and to modify the formatting characteristics of the data in the underlying user document. Pop-up menus and shortcut keys are also available for modifying the formatting characteristics of data selected in the rich text edit field. The rich text edit control can accept data from another window and can inherit its formatting characteristics in order to display the data the way the data will appear in the underlying document. In one embodiment, the rich text edit control is provided by the underlying word processing application program so as to utilize the same routines for editing and formatting data in a rich text edit field as within an underlying document.

37 Claims, 18 Drawing Sheets

METHOD AND SYSTEM FOR EDITING AND FORMATTING DATA IN A DIALOG WINDOW

CROSS REFERENCE TO RELATED APPLICATION

This application is a continuation of U.S. patent application Ser. No. 08/299,938, filed Sept. 1, 1994 U.S. Pat. No. 5,579,466.

TECHNICAL FIELD

The present invention relates generally to a computer system for editing and formatting data in a dialog window and, more specifically, to a method and system for editing and formatting data in a dialog window using a rich text edit field.

BACKGROUND OF THE INVENTION

Often times, a user authoring a document wishes to modify some data in the document through the use of a dialog window. For example, if the user wishes to replace a word in a phrase and to change the formatting of the phrase to an italicized larger font, then the user replaces the existing word with a new word and reformats the phrase using the tools supplied by the application program that manages the document (typically a word processing application program). In some prior systems, these actions are performed in two separate steps. First, the user modifies the textual content typically by deleting the existing word and replacing it by a new one or by typing over a selected word. Second, the user selects the phrase and invokes a formatting command to request formatting changes, typically provided by a menu or by a dialog window. For example, in the Microsoft Word for Windows 2.0 product, the user invokes the Format Character dialog window from the menu bar to change the font attributes of the selected phrase.

A dialog window is a window that displays dialog fields to provide the user with information and to enable the user to input information and data to the underlying application program. Typically, the information and input capabilities provided by the dialog window relate to the context from which the dialog window was invoked. For example, when the Format Character dialog is invoked as described above, the input choices and information provided relate to data that was selected prior to invoking the dialog. In a typical window system, dialog windows are invoked from menu commands or by clicking with a user input device, such as a mouse, in specific areas on the computer display.

In a typical computer window system environment, the dialog fields displayed in a dialog window are implemented by dialog controls supplied by the underlying system (e.g., the window system, operating system, or other similar code). For example, some computer systems support standard dialog controls such as a button for specifying an action to perform; a check box, or similar control, for specifying a choice of n out of m items; a radio button, or similar control, for specifying a choice of one out of m items; a list control for displaying a list of choices; and edit controls for inputting data (typically text). In these prior systems, edit controls typically include three types: a single-line edit control, which allows the user to enter text in a single predetermined font not exceeding one line; a multi-line edit control, which allows the user to enter multiple lines of text in a single predetermined font; and display-only single- and multi-line "edit" controls, which display text without edit capability.

FIG. 1 is an example dialog window in the Microsoft Word for Windows 2.0 product that contains several types of dialog fields. Specifically, FIG. 1 shows display screen 101 displaying an underlying user document entitled "WFWDEMO.DOC" being edited in document window 102. The Summary Info dialog window 103 is displayed in response to the user selecting the Summary Info command from the File menu on the document window 102. The Summary Info command allows users to enter document summary information pertaining to the underlying user document.

The Summary Info dialog window 103 is shown containing several different fields that can be implemented using the dialog control types discussed above. For example, the File Name and Directory fields 104 can be implemented using display-only single-line "edit" controls. Also, the Title, Subject, Author, and Keywords fields 105 can be implemented using a single-line edit control. The Comments field 106 is an example of a multiple line edit field that can be implemented using a multi-line edit control. The "OK," "Cancel,"0 and "Statistics" buttons 107 can be implemented using button controls.

FIG. 2 is an example dialog window in the Microsoft Word for Windows 2.0 product that contains dialog fields that can be implemented using other types of dialog controls. Specifically, the Page Setup dialog window 203 is displayed in response to the user invoking the Page Setup command from the Format menu on the document window 202. The Page Setup dialog window 203 contains a radio button field 204 for selecting which page attributes to modify; the Facing Pages field 205; which can be implemented using a check box control; and other fields, such as the "Apply To" list field 206, which can be implemented by combining other controls or by implementing more specialized controls. The Page Setup dialog window 203 also contains the Sample field 207, which can be implemented by drawing a picture in the dialog window. This kind of picture is sometimes referred to as a picture item.

SUMMARY OF THE INVENTION

The limitations of prior systems are overcome by the present invention, which is an improved method and system for editing and formatting data in a dialog window. In a preferred embodiment, a rich text edit field is provided for inputting data, modifying the formatting characteristics of the input data, and for previewing the modified data and formatting characteristics as they will appear when accepted. This capability enables a user to preview and further modify changes before accepting them into an underlying user document.

In one embodiment, the rich text edit field is implemented by a rich text edit control provided by the underlying word processing application program. The rich text edit control utilizes the character inputting, displaying, and formatting routines of the underlying word processing application program. In this embodiment, a word processing document is allocated and attached to the rich text edit control such that when the user inputs and edits data within the rich text edit field implemented by the rich text edit control, the rich formatting capabilities of the underlying word processing application program are available.

In another embodiment, the present invention provides a way to initially display formatted data in the rich text edit field with formatting characteristics inherited from the underlying user document. In another embodiment, the formatting characteristics of the initially displayed data are inherited from data incorporated from a document other than the user document. In yet another embodiment, the formatting characteristics of the initially displayed data are inherited from data incorporated from another window.

In another embodiment, data is entered into the rich text edit field by incorporating copied, moved, or linked data from another window.

In another embodiment, a menu is used to indicate formatting modifications to the data displayed in the rich text edit field. In yet another embodiment, shortcut keys are used to indicate formatting modifications.

In another embodiment, a dialog author can indicate which capabilities are enabled for a rich text edit field, including which techniques are enabled for indicating formatting changes and whether the rich text edit field is displayed with scroll bars.

DETAILED DESCRIPTION OF THE INVENTION

Figure 1:
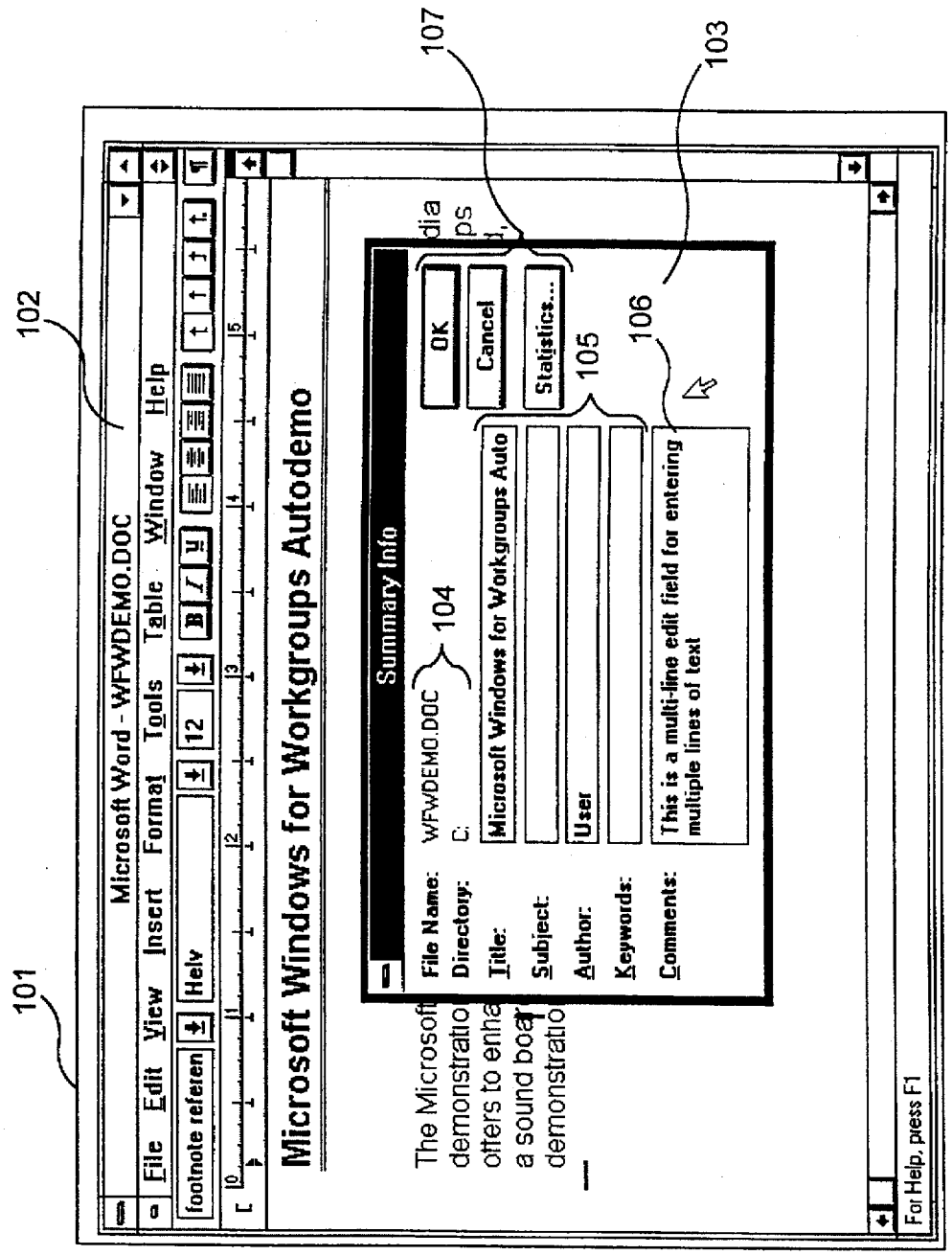
FIG. 1 is an example dialog window in the Microsoft Word for Windows 2.0 product that contains several types of dialog fields.
Figure 2:
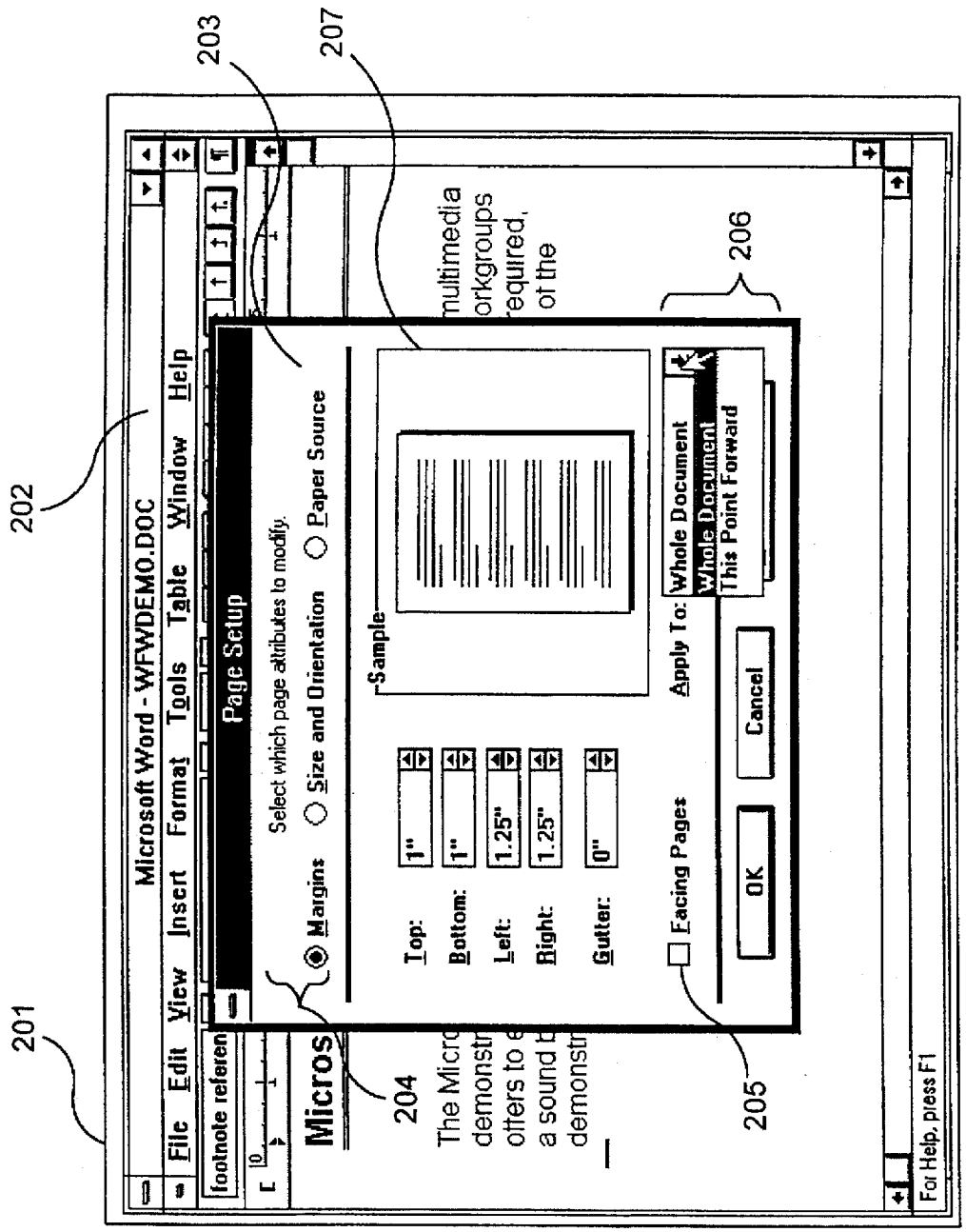
FIG. 2 is an example dialog window in the Microsoft Word for Windows 2.0 product that contains dialog fields that can be implemented using other types of dialog controls.

Embodiments of the present invention provide methods and systems for editing and formatting data in a dialog window. According to the present invention, a user inputs formatted data to an underlying application program through a rich text edit field in a dialog window. A rich text edit field is an edit field that allows data to be input and the formatting characteristics, such as the character and paragraph attributes, of the data displayed in the edit field to be modified. A user can enter data and modify the formatting characteristics of the entered data preferably using the same techniques and mechanisms provided to enter data and to modify formatting characteristics in underlying user documents. Although the present invention is discussed with reference to an underlying word processing application program, one skilled in the art will appreciate that the present invention is useful in other contexts as well, such as with database entry forms.

Embodiments of the present invention provide a rich text edit control (a dialog control) that implements rich text edit fields. The rich text edit control preferably enables the user to input data and to format that data in a "what you see is what you get" ("WYSIWYG") fashion. That is, the user is able to view the data and the formatting characteristics of the data the way the data will appear in the underlying user document when the dialog window is closed.

Embodiments of the present invention allow the user to enter data directly into the rich text edit field using the keyboard. Alternatively, the user can select data from another window, such as a clipboard window, and copy, move, or link the selected data into the rich text edit field. When data is incorporated from another window, the formatting characteristics of the data are also inherited so that the incorporated data is displayed in the rich text edit field with the same formatting characteristics as the original selected data.

Embodiments of the present invention also provide several mechanisms for modifying the formatting characteristics of the data displayed in the rich text edit field. For example, in one embodiment, the user can modify font and paragraph attributes, such as point size and paragraph alignment, by invoking "pop-up" menus displayed, for example, in response to a user request by means of an input device such as a mouse. (Pop-up menus are menus that pop up on the display as opposed to being available through a displayed menu bar.) Although embodiments of the present invention are preferably addressed to enabling modification of formatting characteristics for font and paragraph attributes, one skilled in the art will appreciate that these same techniques may be used to support modification of other formatting attributes, for example, border formatting.

In addition to the techniques described above, the user can use the standard shortcut keys available from the underlying word processing application program for entering and formatting the data in the rich text edit field. Shortcut keys are key sequences defined by the underlying application program that directly map to functions otherwise invoked by performing several user actions. For example, the key sequence "CTRL-B" is a shortcut key that requests the underlying application program to change the character formatting of any selected data to emboldened data.

Embodiments of the present invention also provide the ability to add a vertical scroll bar to the rich text edit field to enable the user to add more text than would be visible in the predefined display area reserved for the rich text edit field.

Figure 3A:
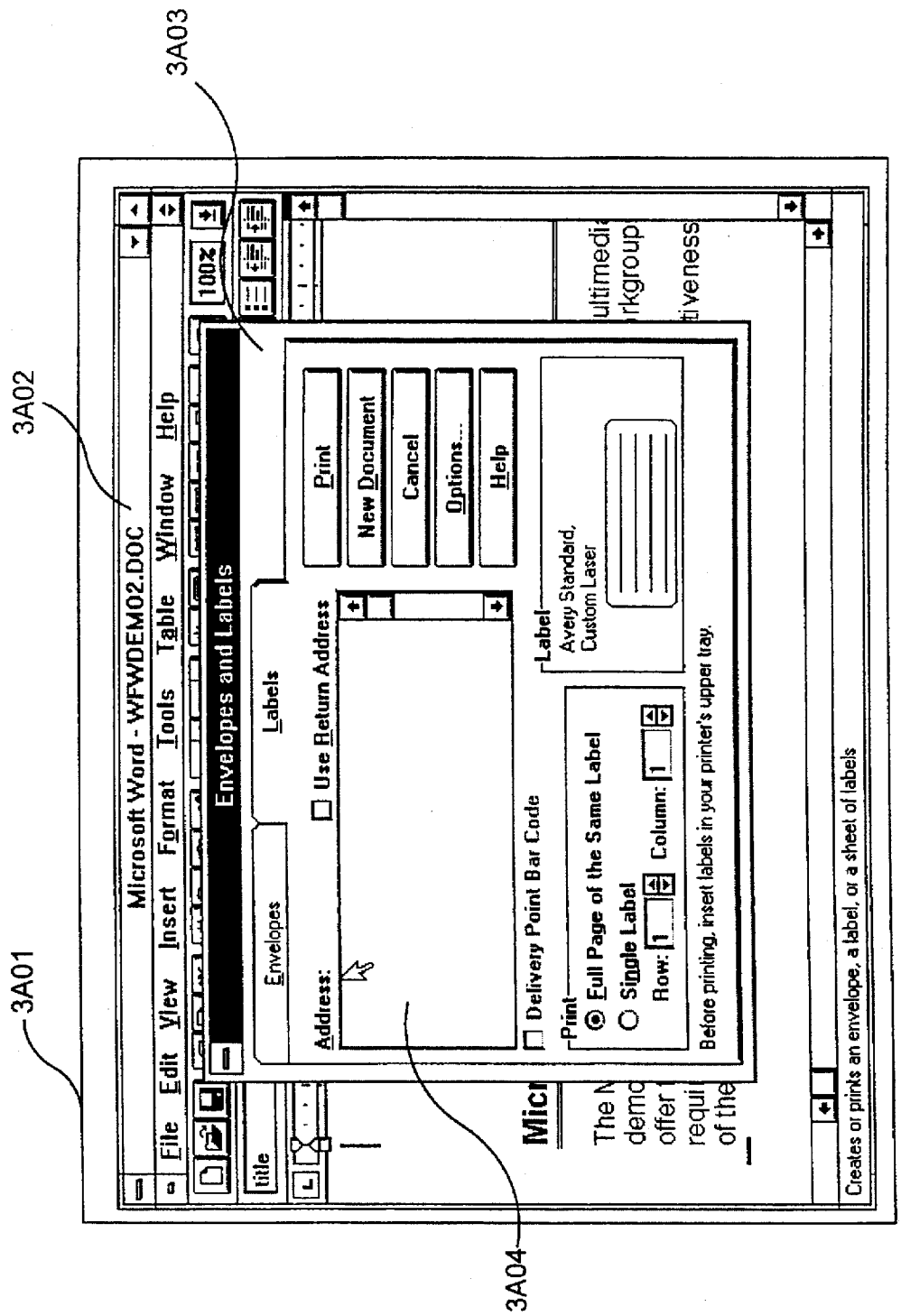
FIG. 3A is an example screen display of a dialog window containing a rich text edit field.

FIGS. 3A-3E provide an example sequence of how a user utilizes a rich text edit field in a dialog window to enter data and to modify the formatting characteristics of that data. FIG. 3A is an example screen display of a dialog window containing a rich text edit field. As shown, the user is currently editing user document "WFWDEMO2.DOC" in a word processing application program document window 3A02 on display screen 3A01. The Envelopes and Labels dialog window 3A03 has been invoked in response to selection of the Envelopes and Labels command from the Tools menu of the document window 3A02. Dialog window 3A03 contains instructions and data for creating envelopes and labels corresponding to the underlying user document displayed in document window 3A02. The Envelopes and Labels dialog window 3A03 is shown as it is initially displayed containing the empty Address field 3A04, which is implemented by a rich text edit control.

To enable the computer system to open a dialog window, the present invention provides a dialog resource file to specify the fields, including any rich text edit fields, that should be displayed on the dialog window when it is opened and the state information for the dialog controls that implement these fields. When the dialog window is opened, the dialog management code that implements the dialog window behavior uses the information in the dialog resource file to display the defined dialog fields on the dialog window and to set the initial state of the dialog controls that implement these fields. Thus, when a dialog window is opened for a dialog resource file that contains a rich text edit control definition, a corresponding rich text edit field is displayed with an initial state as defined by the dialog resource file and the initialization routines of the dialog management code. For example, the Address field 3A04 is initially displayed containing no data because the dialog resource file definition for this rich text edit field contains no initial data and the initialization code does not add any data.

Figure 3B:
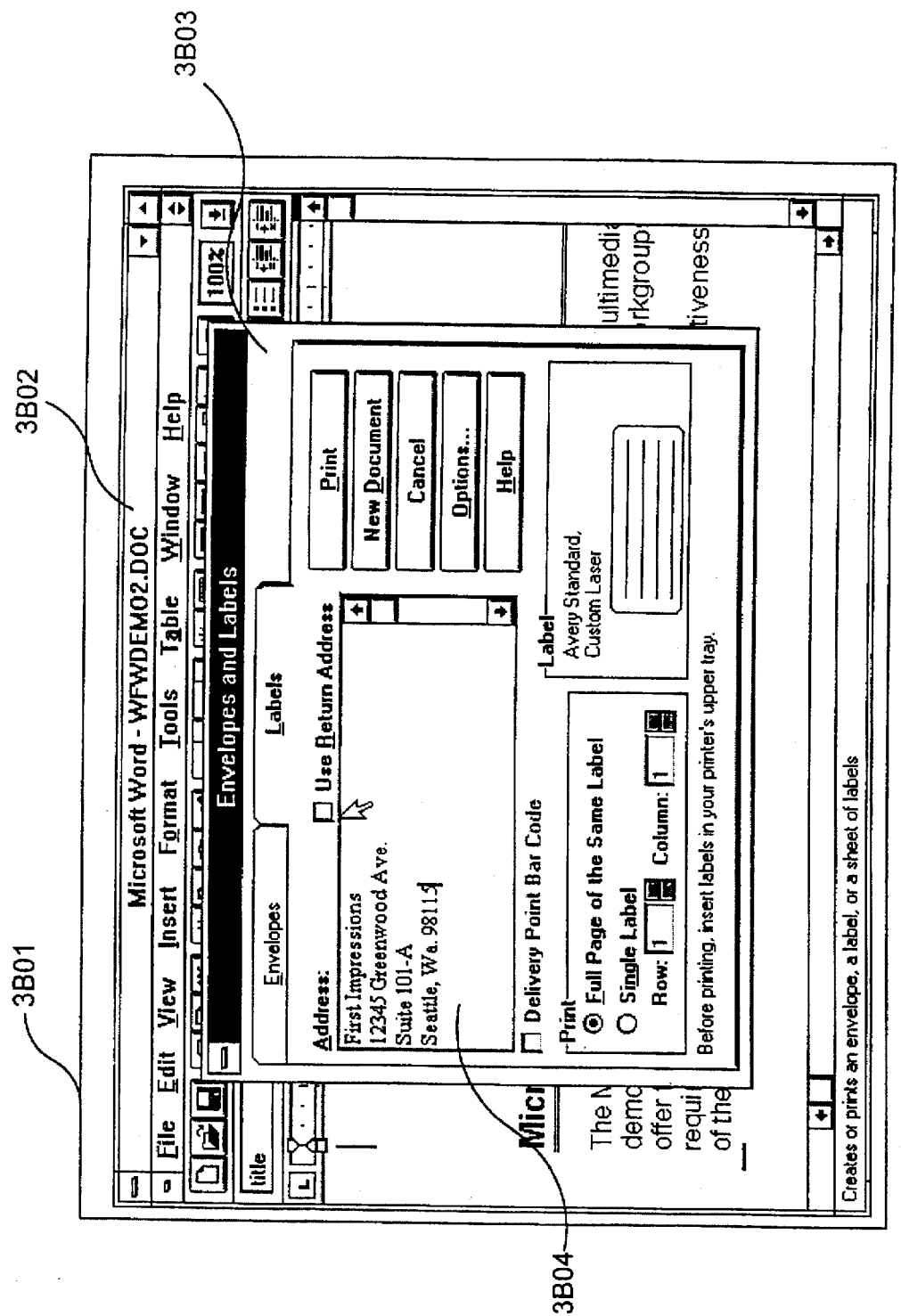
FIG. 3B is an example of the resulting screen display of the rich text edit field of FIG. 3A after the user has input initial textual data.

FIG. 3B is an example of the resulting screen display of the rich text edit field of FIG. 3A after the user has input initial textual data. In FIG. 3B, the Envelopes and Labels dialog window 3B03 displays the entered text in the rich text edit field 3B04. Note that the formatting characteristics of the text displayed in the rich text edit field 3B04 can be different from the formatting characteristics of the currently selected data in the underlying user document (not shown). This capability is supported by setting an initial set of characteristics in an initialization routine in the dialog management code for dialog window 3B03.

Figure 3C:
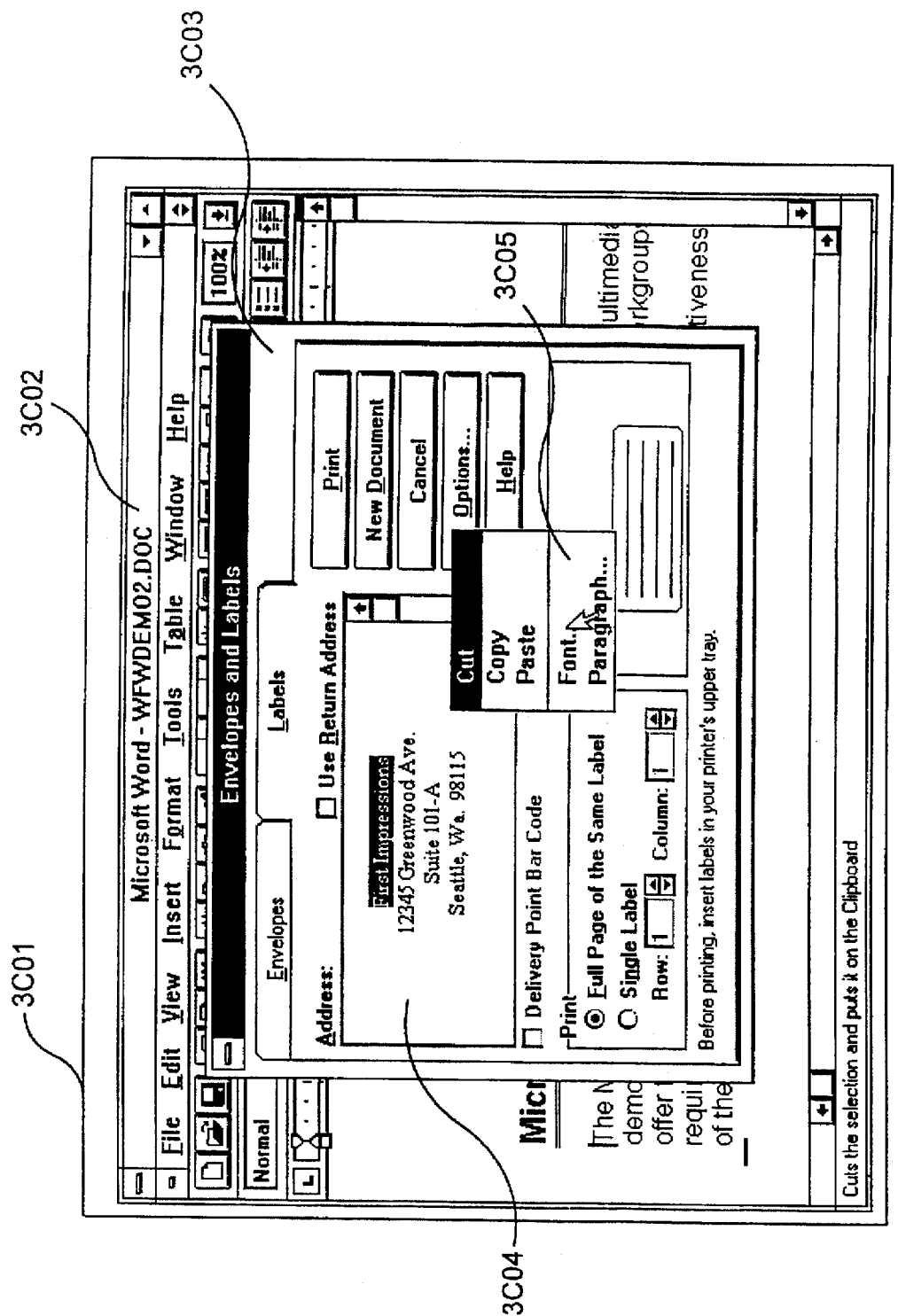
FIG. 3C is an example of the display screen when using a menu to modify the formatting characteristics of the data displayed in the rich text edit field of FIG. 3A.

FIG. 3C is an example of the display screen when using a menu to modify the formatting characteristics of the data displayed in the rich text edit field of FIG. 3A. In FIG. 3C, the text currently displayed in the rich text edit field 3C04 is shown after the user has invoked the paragraph item on the pop-up menu 3C05 to change the paragraph alignment to centered alignment. FIG. 3C also illustrates the first steps in the sequence that is further illustrated in FIGS. 3D and 3E of the actions performed to change the font attributes of the data displayed in the rich text edit field 3C04. First, the user selects the data in the rich text edit field 3C04 that the user wishes to modify. Next, by clicking on the rich text edit field 3C04 with a user input device such as a mouse, the user invokes the pop-up menu 3C05 and selects the font item from the menu 3C05.

Figure 3D:
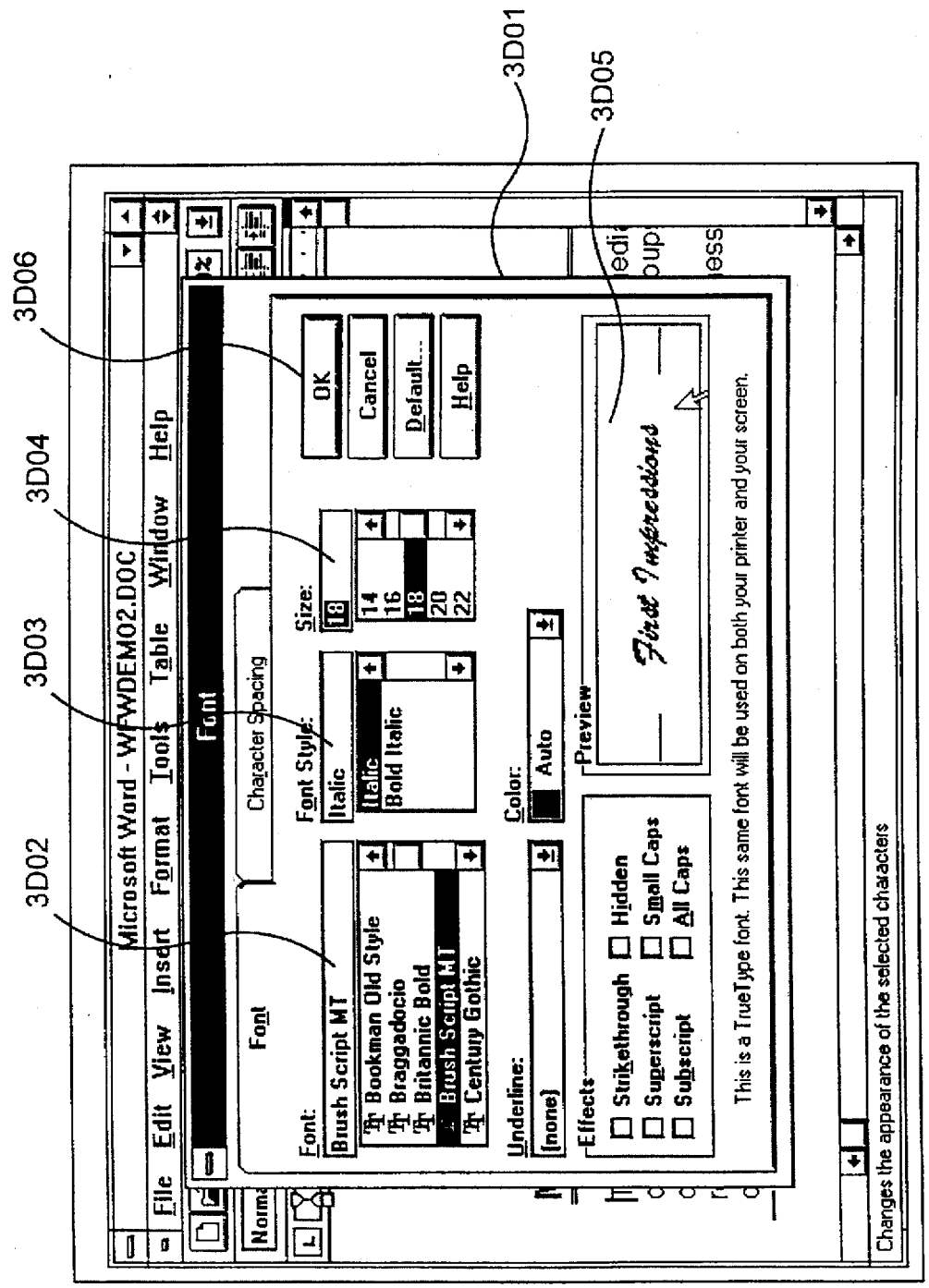
FIG. 3D is an example of a formatting dialog window displayed in response to invoking a menu command to change the font attributes of selected data in the rich text edit field of FIG. 3C.

FIG. 3D is an example of a formatting dialog window displayed in response to invoking a menu command to change the font attributes of selected data in the rich text edit field of FIG. 3C. FIG. 3D shows the Font dialog window 3D01 containing dialog fields for changing the font 3D02, the font style 3D03, and the font point size 3D04, and containing the Preview field 3D05 for previewing the effect of the current state of the dialog controls on the data selected prior to invoking the Font menu item in FIG. 3C. Once the user has decided which font attributes are desired, the user presses the OK button 3D06 and the dialog window 3D01 is closed.

Figure 3E:
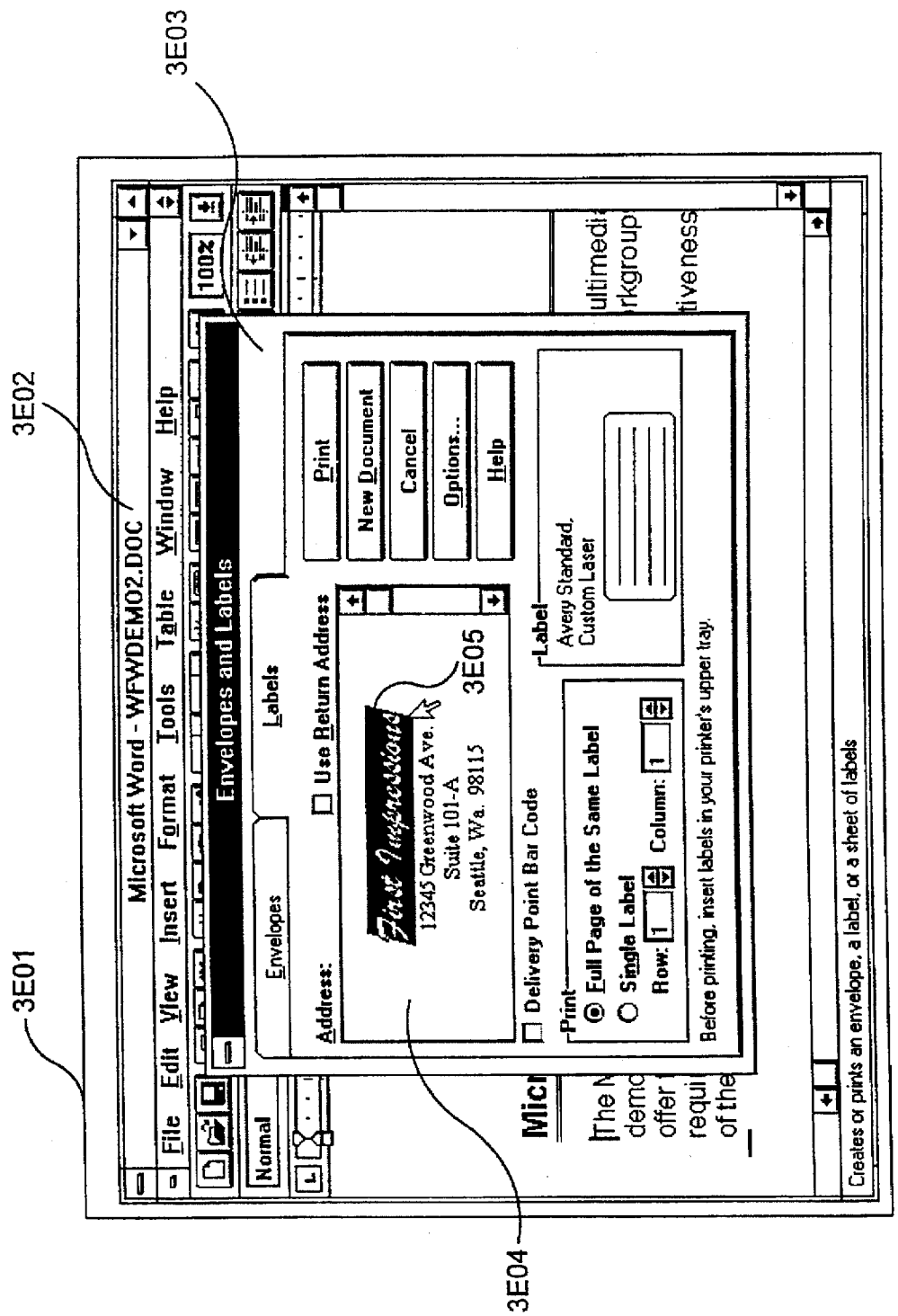
FIG. 3E is an example of the resulting screen display after modifying the font attributes of the selected data displayed in the rich text edit field of FIG. 3C.

FIG. 3E is an example of the resulting screen display after modifying the font attributes of the selected data displayed in the rich text edit field of FIG. 3C. The text that was selected in the rich text edit field 3C04 in FIG. 3C is shown in FIG. 3E as selected text 3E05 with its formatting characteristics modified to reflect the final selection of attributes in the dialog window 3D01 in FIG. 3D. One skilled in the art will appreciate that the techniques used to modify the formatting characteristics of data in a rich text edit field displayed as part of a dialog window are preferably analogous to the techniques used to modify the formatting characteristics of data in the underlying user document.

Figure 4A:
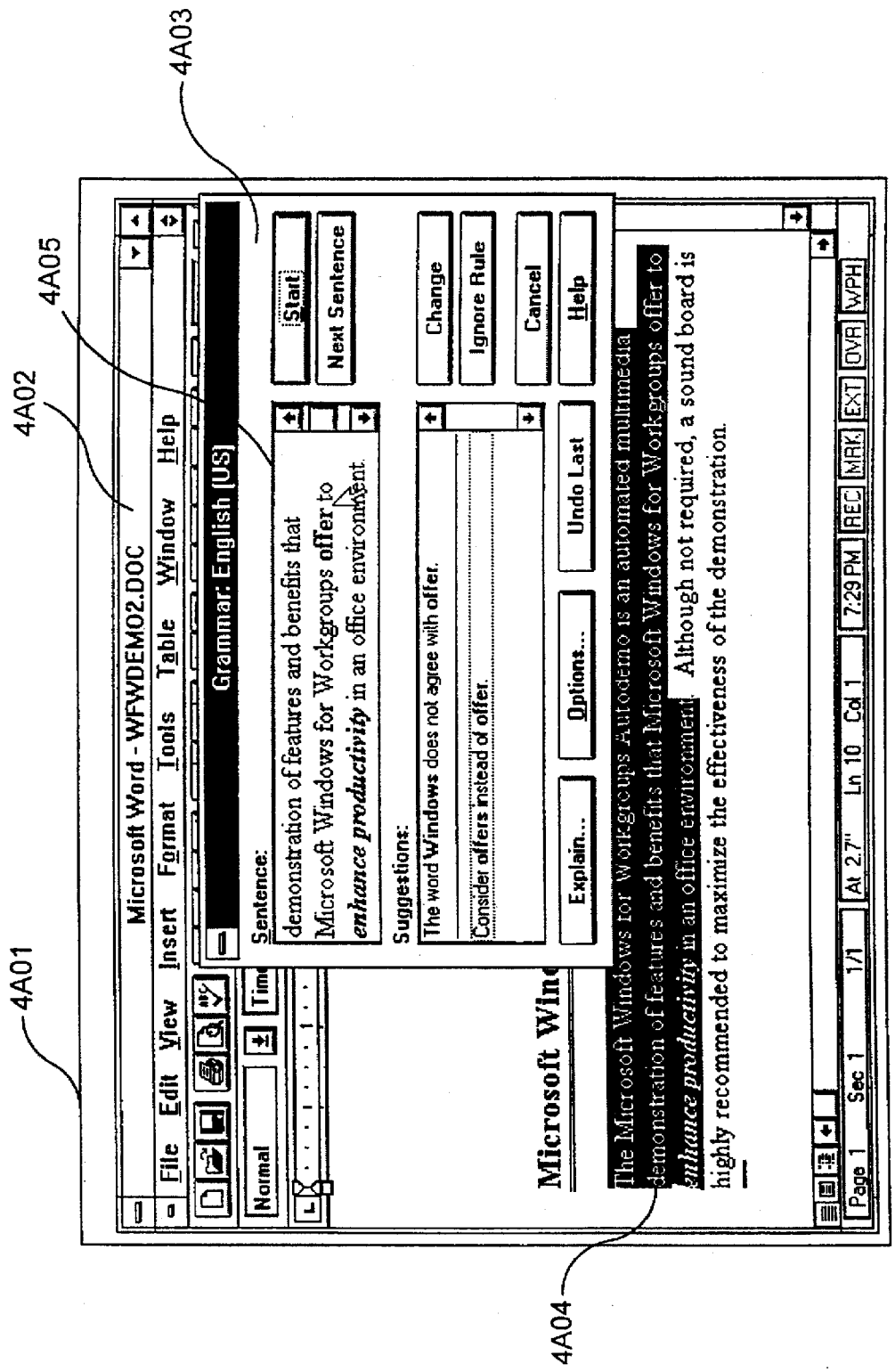
FIG. 4A is an example dialog window with a rich text edit field that inherits formatting characteristics from an underlying user document.

FIGS. 4A-4D provide an example sequence of how a user utilizes a rich text edit field in a dialog window to edit and format data from an underlying user document and to preview the modifications in a WYSIWYG fashion before accepting them as new data in the underlying user document. FIG. 4A is an example dialog window with a rich text edit field that inherits formatting characteristics from an underlying user document. Specifically, in response to the user invoking the Grammar command from the Tools menu of document window 4A02, the Grammar dialog window 4A03 is displayed on the display screen 4A01 with a sentence displayed in the rich text edit field 4A05 that contains incorrect grammar. The sentence with the incorrect grammar is shown highlighted as data 4A04 in the underlying user document displayed in document window 4A02. The data initially displayed in rich text edit field 4A05 reflects the formatting characteristics of the highlighted data 4A04 in the underlying user document displayed in document window 4A02. For example, the phrase "enhance productivity" is displayed as emboldened, italicized text in both the underlying user document displayed in window 4A02 and in the rich text edit field 4A05.

Figure 4B:
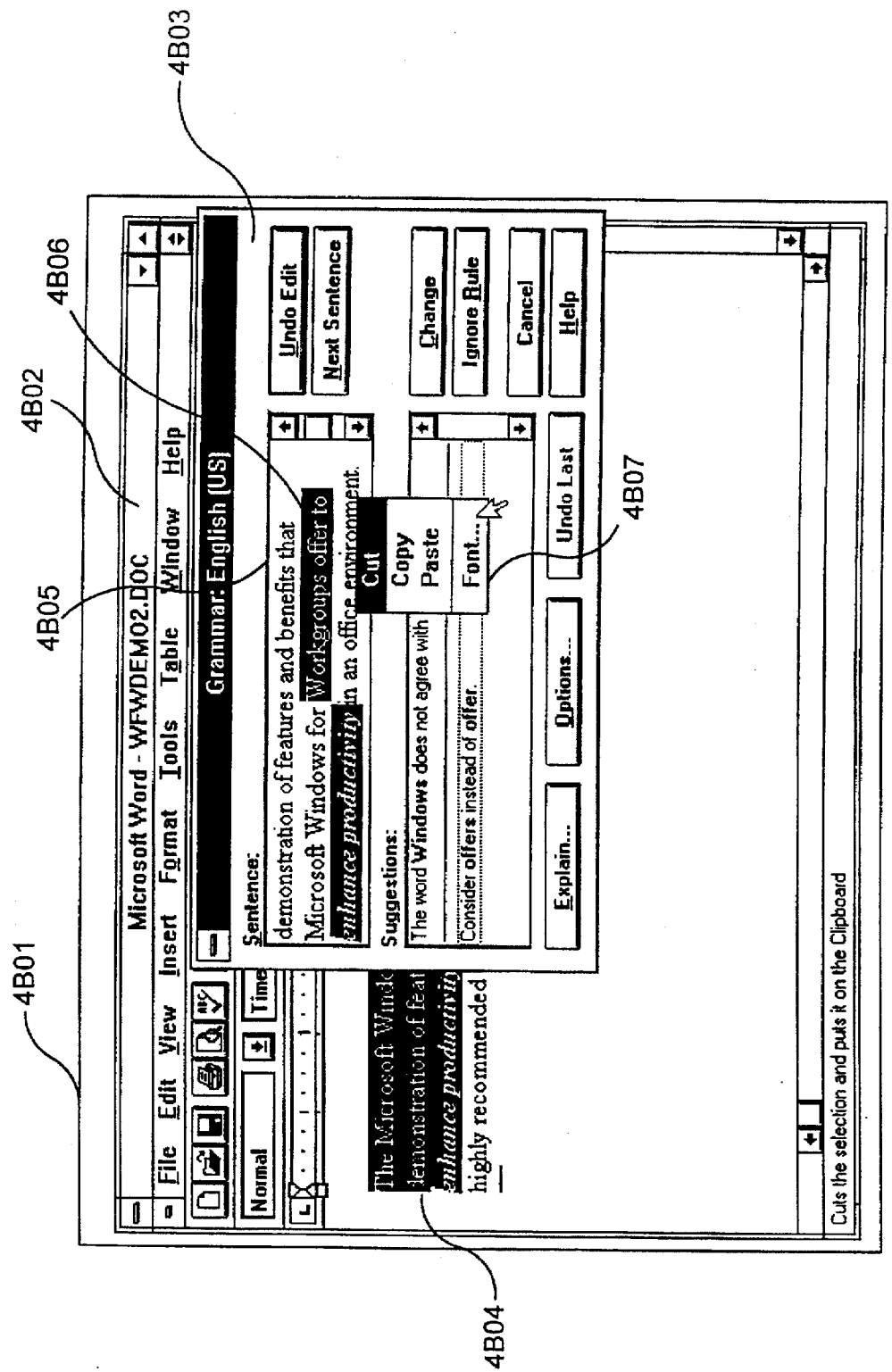
FIG. 4B is an example of the display screen when modifying the font attributes of selected text in a rich text edit field using a menu with restricted formatting capabilities.

FIG. 4B is an example of the display screen when modifying the font attributes of selected text in a rich text edit field using a menu with restricted formatting capabilities. The user first selects the data to be modified, which is displayed as selected text 4B06. Next, the user invokes a Font dialog window to change the font attributes of the selected text 4B06 by invoking a pop-up menu as described with reference to FIG. 3D. Note, however, that pop-up menu 4B07 does not contain an item for modifying paragraph attributes. The contents of the menu 4B07 are preferably controlled by flags in the dialog resource file, as described further below.

Figure 4C:
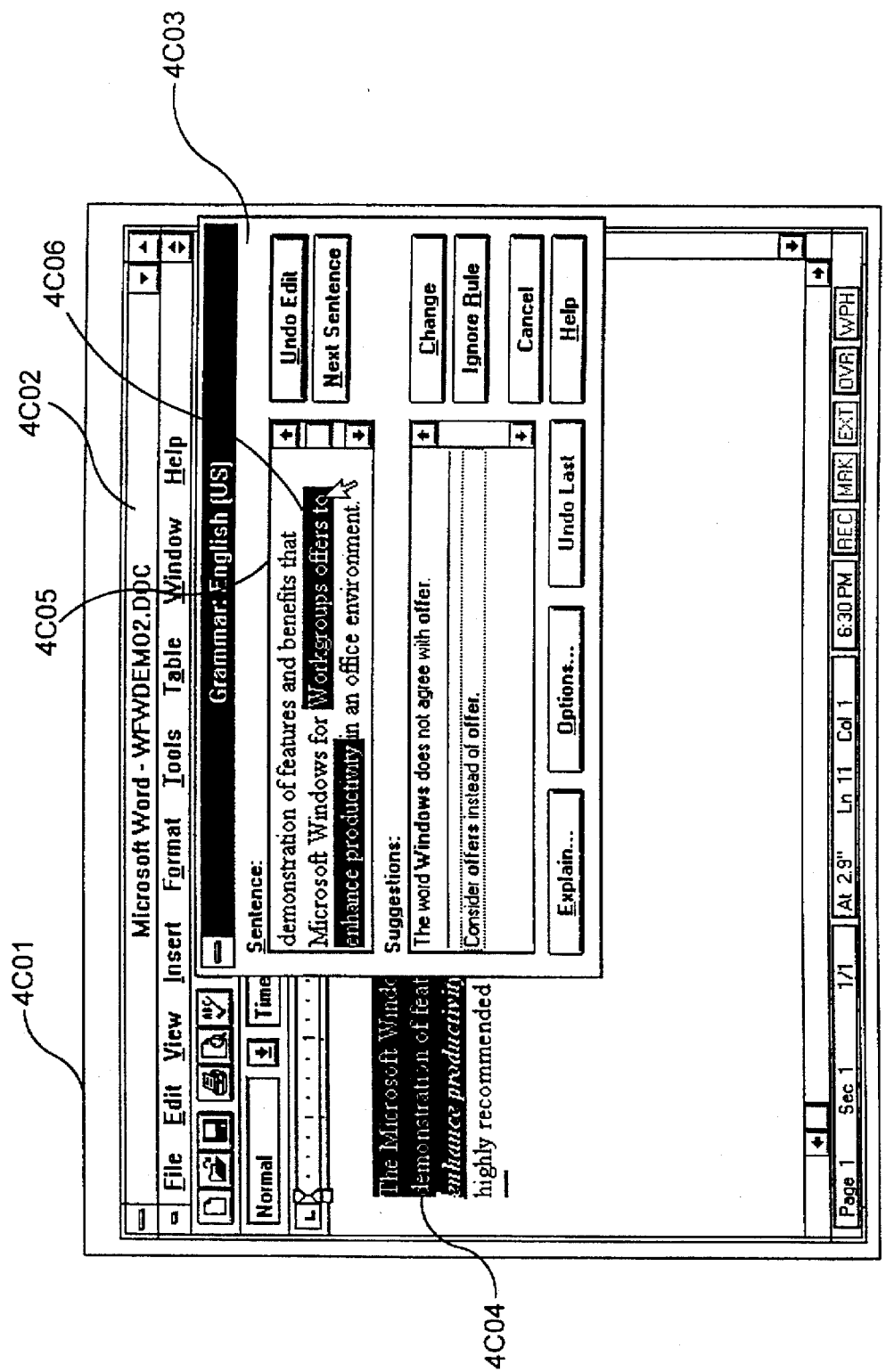
FIG. 4C is an example of the resulting screen display of the rich text edit field of FIG. 4B after modifying the font attributes and data contents of the rich text edit field.

FIG. 4C is an example of the resulting screen display of the rich text edit field of FIG. 4B after modifying the font attributes and data contents of the rich text edit field. Specifically, the data indicated as selected text 4C06 has been edited to fix the grammatical error ("offer" to "offers") and to remove the previous emboldened and italicized phrase. Because this change has not been accepted yet by the user, the unmodified highlighted text 4C04 remains displayed in the underlying user document as shown in document window 4C02.

Figure 4D:
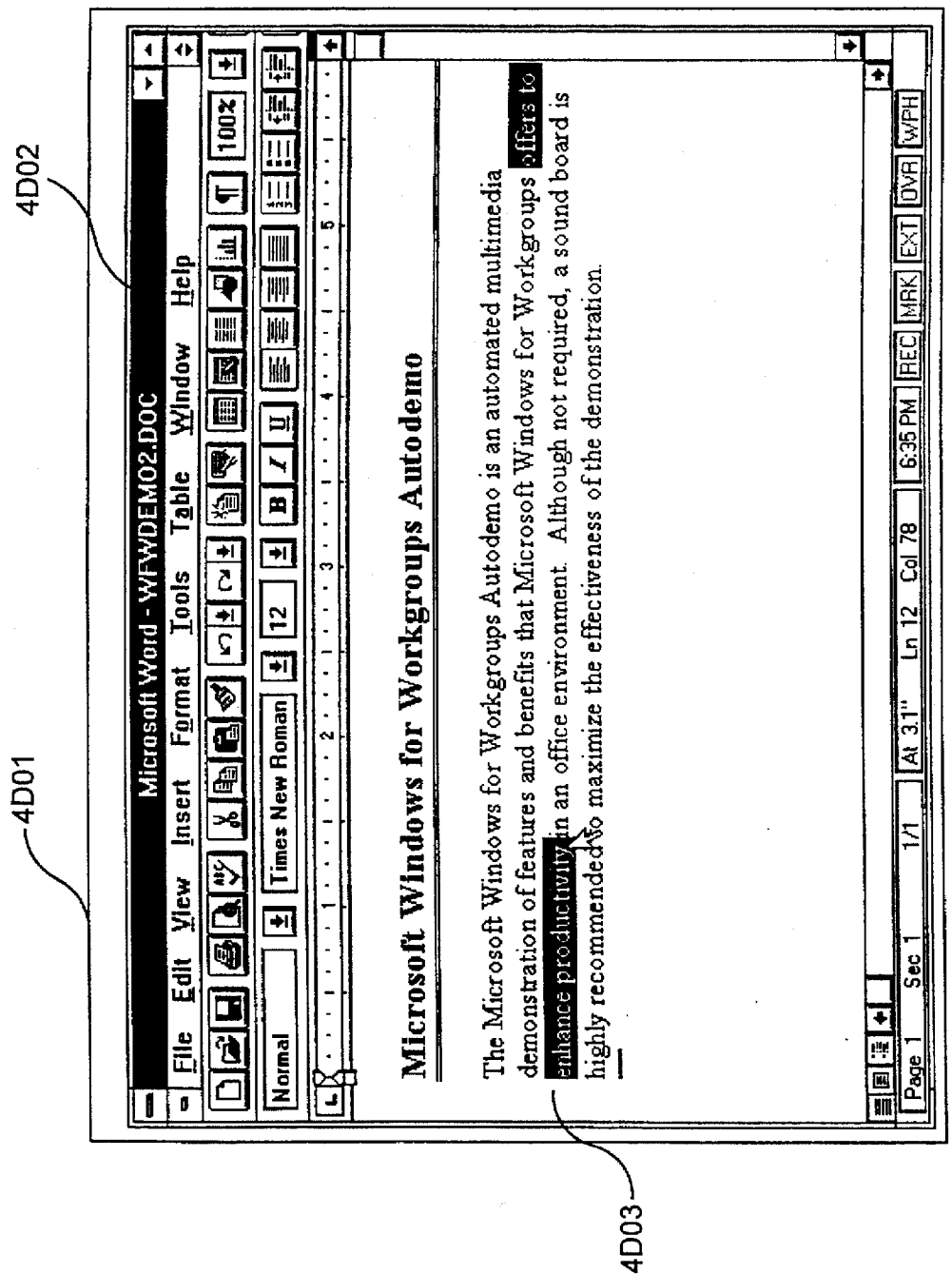
FIG. 4D is an example screen display of the results in the underlying document after using a rich text edit field to edit and format data from the underlying document.

FIG. 4D is an example screen display of the results in the underlying document after using a rich text edit field to edit and format data from the underlying document. As shown, selected text 4D03 illustrates the resulting modification that occurs to the underlying document displayed in document window 4D02 after closing the Grammar dialog window 4C03 displayed in FIG. 4C.

In preferred embodiments, the methods and systems of the present invention are implemented on a computer system comprising a central processing unit, a display, a memory, and input/output devices. Preferred embodiments are designed to operate in a windowed word processing environment, such as an environment that supports the Microsoft Windows environment defined by Microsoft Corporation in Redmond, Wash. One skilled in the art will also recognize that embodiments of the present invention can be practiced in other windowed environments.

Figure 5:
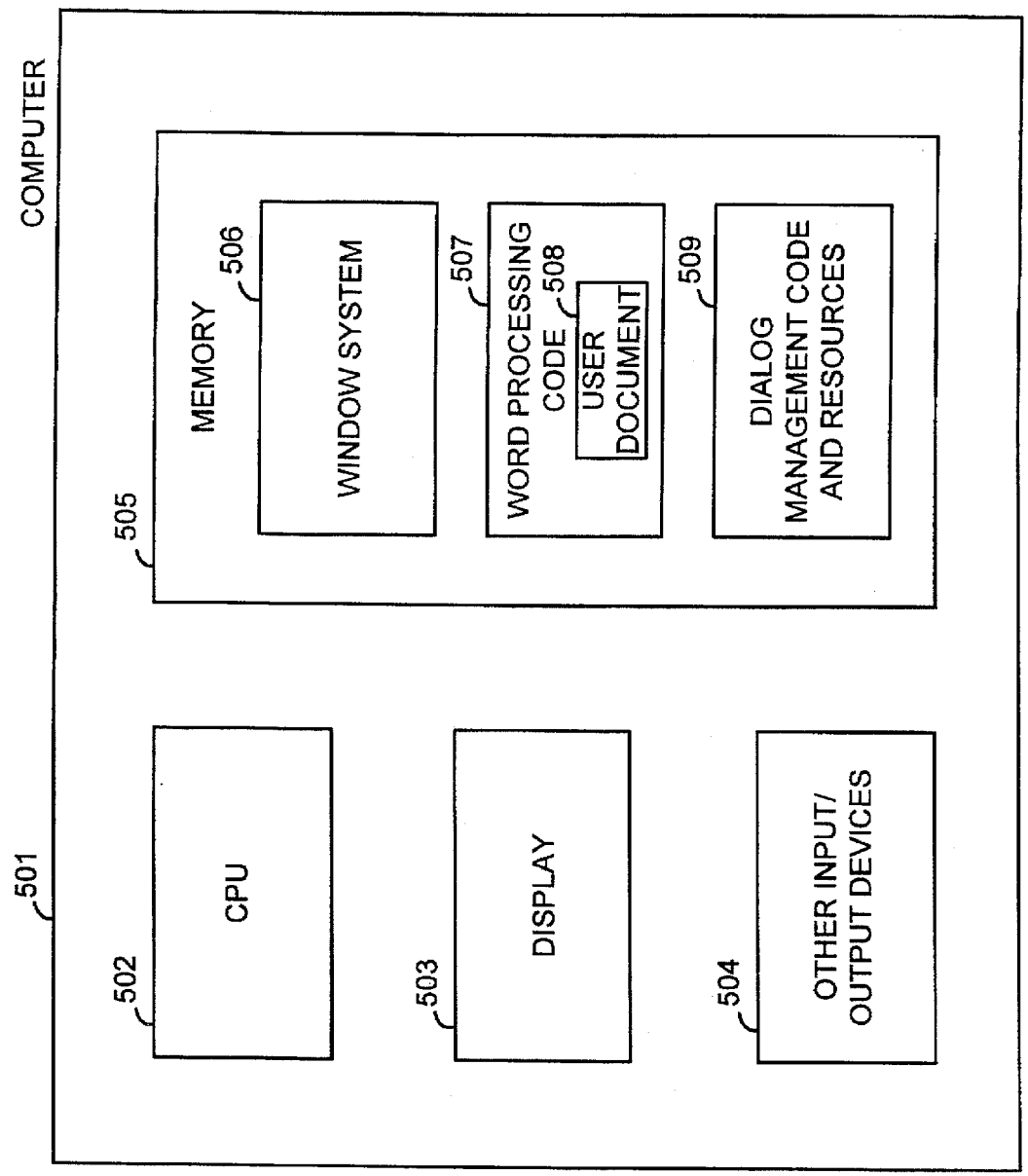
FIG. 5 is a block diagram of a general purpose computer system for practicing preferred embodiments of the present invention.

FIG. 5 is a block diagram of a general purpose computer system for practicing preferred embodiments of the present invention. The computer system 501 contains a central processing unit (CPU)502, a display screen (display) 503, input/output devices 504, and a computer memory (memory) 505. The window system, as well as the word processing application program and other programs, preferably reside in the memory 505 and execute on the CPU 502. The word processing code 507 is shown containing a user document 508 while the document is being edited in memory. Dialog management code 509 for implementing the dialog windows that provide user input to the word processing code 507 also reside in computer memory 505. One skilled in the art would appreciate that the methods of the present invention may be practiced on processing systems with varying architectures and on systems with hardwired logic. Also, one skilled in the art will realize that the present invention can be implemented in a distributed environment, where more than one computer system is used to communicate with other computer systems.

In one aspect of the invention, a preferred embodiment provides a rich text edit control for implementing a rich text edit field in a dialog window. This rich text edit control is preferably provided by the underlying system to enable dialog authors to support editing and formatting data in an edit field in a dialog window. In one preferred embodiment, the rich text edit control is preferably provided by a word processing application program to enable the rich text edit control to support the same rich formatting capabilities as the underlying word processing application program and to utilize the underlying code already existent for performing editing and formatting in a user document. In this embodiment, a word processing document and its associated structures are allocated and associated with the rich text edit field. When a user indicates that the user desires to edit data in the rich text edit field, the document associated with the rich text edit field becomes the "current document" and the word processing code edits and formats data in that document using its standard routines. (The current document is the document the word processing application program is currently editing.)

In order for this embodiment to incorporate the capabilities of rich text edit fields into existing word processing application code, the system of the present invention preferably integrates the rich text edit control code with the dialog management code and the word processing application code in as unobtrusive a manner as possible. In summary, a dialog resource file is created that hooks into the word processing code through a rich text edit control callback routine, a rich text edit control window procedure, and the dialog management code. The dialog resource file contains the definitions for the dialog edit fields and dialog controls as described above. With respect to a rich text edit field, the dialog resource file contains an indication of rich text edit control specific code (a callback routine) that allocates the document structures for the rich text edit field when the dialog window is opened and that hooks the rich text edit control into the word processing code. In addition, the resource file contains a indication of the window procedure to be used to process mouse events received in the rich text edit field. Also, the resource file contains dialog specific initialization code for setting up the document structures allocated by the rich text edit control callback routine (when the dialog is opened) according to the definitions in the dialog resource file.

When a dialog is created, typically in response to some user action, the system of the present invention invokes dialog management code to open a dialog window with the proper contents and to manage input and output to the dialog window. The underlying system provides a general (standard) dialog procedure to manage input and output to dialogs in general. For each action taken by the standard dialog procedure (e.g. opening a dialog), the standard dialog procedure does the action and then invokes dialog specific code (e.g. such as the dialog specific initialization code indicated by the dialog resource file) to enable dialog specific event handling to occur. Thus, when invoked to create a dialog, the standard dialog procedure opens the dialog window, invokes the indicated callback routine defined in the dialog resource file to create the document structures, and then invokes the dialog specific initialization code to initialize these structures according to the definition of the rich text edit control in the dialog resource file. One skilled in the art will appreciate that other architectures exist, for example, a system can be provided that does not support a standard dialog procedure and, instead, each dialog definition preferably provides its own dialog management code.

Once the dialog window containing the rich text edit field is open and displayed on the display screen, a user can input data to the rich text edit field and change the formatting of the data. To perform these actions, the user navigates to the rich text edit field using well-known dialog navigation techniques, for example by clicking on the appropriate field with a user input device such as a mouse, or by navigating to the field using the keyboard. In one embodiment, when the user navigates to the rich text edit field, the dialog procedure receives the corresponding keyboard or mouse event. The dialog procedure then notifies the corresponding rich text edit control through its callback routine to inform it that the rich text edit field has keyboard focus (should process keystrokes). When the next and subsequent keyboard events are received (by the dialog procedure), the dialog procedure notifies the callback routine, which in turn sets the current document to the document associated with the rich text edit field (when the keyboard focus is initially indicated) and notifies the word processing code to process the keyboard event. (In the typical case, unlike the rich text edit field case, when a dialog field has keyboard focus, keyboard events are passed to the dialog procedure and are processed directly by the dialog procedure.) The word processing code then processes the keyboard event in its normal input loop. Because the current document is set to the document associated with the rich text edit field, the input will automatically appear in and be processed with respect to the rich text edit field. Alternatively, the callback routine could be programmed to handle the editing and formatting capabilities without passing events to the word processing code.

In an alternative embodiment, such as in the Microsoft Windows environment, where events are dispatched to other programs only when one program relinquishes control back to the window system, the integration of the components is slightly modified. Specifically, the word processing program has control of the environment at the time the dialog window is opened. Therefore, the word processing program can peek at each event message and determine whether it desires to process the event or to allow it to be dispatched to another piece of code (such as the dialog procedure). According to this embodiment, the word processing code ignores and dispatches dialog navigation events, but processes keyboard events before the dialog procedure has a chance to detect them. Accordingly, the rich text edit control preferably does not receive keyboard events.

Using either embodiment, when the user starts typing, the main input loop (WinMain) of the underlying word processing application program receives the input and decides whether a rich text edit field is currently being edited or whether the characters should be passed on to the standard dialog procedure for that dialog window to be distributed to other controls or to be processed for other reasons (such as navigation). If the input loop of the word processing application program determines that it should process the keyboard input character as part of the rich text edit control, then the standard character input routines of the underlying word processing application program are invoked with the current document set to the document associated with that rich text edit field.

Window events are handled in a similar fashion. For each window displayed on the computer display, the program responsible for creating the window associates a window procedure with the window that can be called by the underlying window system when mouse events are received. The window procedure that is registered for the rich text edit control passes the received mouse events on to the underlying word processing application program's selection and navigation routines.

Figure 6:
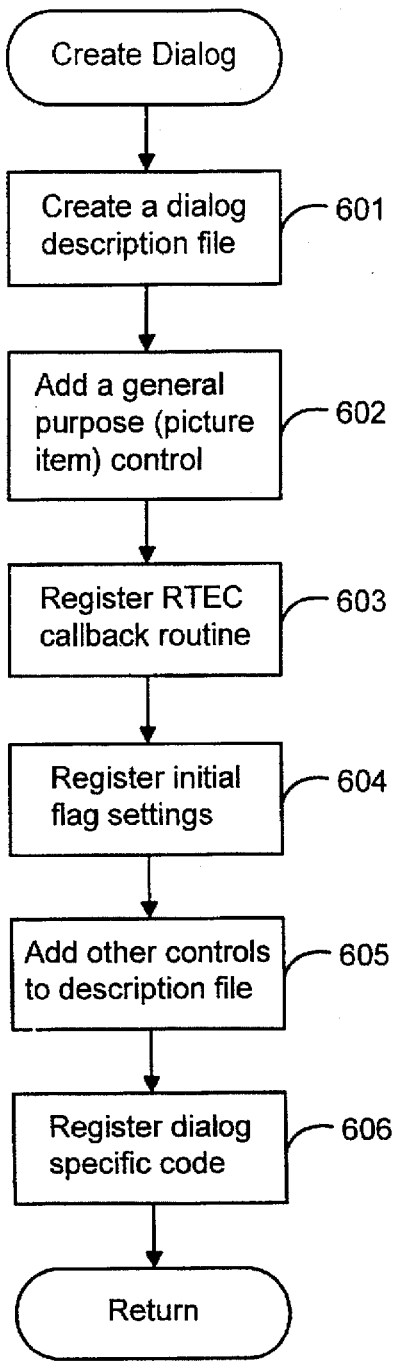
FIG. 6 is a flow diagram of the steps performed by a dialog author to create a dialog resource file that contains a rich text edit control.

FIG. 6 is a flow diagram of the steps performed by a dialog author to create a dialog resource file that contains a rich text edit control. In step 601, the dialog author creates a dialog description file containing definitions of the fields to be displayed in the dialog window and their corresponding dialog controls. In step 602, the dialog author adds a general purpose field (e.g., a picture item) to be used for the rich text edit field. In step 603, the dialog author registers the rich text edit control callback routine that will be called when events are invoked by the user on the corresponding rich text edit field. In step 604, the dialog author registers initial flag settings for the rich text edit control to reflect the desired behavior of the rich text edit field. For example, rich text edit controls can be programmed in this manner to support or to exclude data format modification. Other flag settings are discussed further below. In step 605, the dialog author adds information for the other dialog controls corresponding to fields to be displayed in this dialog. In step 606, the dialog author registers dialog specific code for managing the specific initialization and termination of the defined dialog, and returns.

In one embodiment, the rich text edit control supports various behaviors as determined by the flag settings established in the creation of the dialog resource file, as discussed with reference to step 604 in FIG. 6. In this embodiment, the dialog author specifies whether the rich text edit control corresponding to the rich text edit field to be displayed in the dialog window supports the behaviors shown in Table 1.

In Table 1, the fFontMenu flag and fFontParaMenu flag indicate whether the rich text edit control supports formatting through pop-up menus. The fInsertEnter flag specifies whether the Enter key should be inserted into the rich text edit control and not passed to the dialog procedure. This capability allows the user to edit normally within the rich text edit field by using alternate means closing the dialog window. (Typically, the Enter key in dialog windows is used to request the dialog management code to perform a default action.) The fShortcutKeys flag specifies whether shortcut keys, such as "CTRL-B" for making selected text bold and "CTRL-I" for making selected text italicized, are enabled for basic formatting capability. The fNoEdit flag is used to indicate that the rich text edit control can only be used for display purposes. This flag enables the user to preview the choices made from a dialog window without being able to edit the currently selected text. The fVertScroll flag specifies whether a vertical scroll bar is displayed to allow text to exceed the boundaries displayed in the rich text edit field as displayed in the dialog window. The other flags are provided to enable compatibility with prior systems or to support miscellaneous capabilities.

TABLE 1

| Flag Name | Flag Description |
|---|---|
| fFontMenu | enable pop-up menu with cut, copy, paste, and font commands |
| fFontParaMenu | enable pop-up menu with cut, copy, paste, font, and paragraph commands |
| fInsertEnter | the enter key should be inserted into the rich text edit control and not passed to the dialog procedure |
| fShortcutKeys | enable shortcut keys for basic formatting |
| fCurWwdOnFocus | set the "current document" and the "current selection" to the rich text edit control only while editing |
| fNoEdit | rich text edit control is display only |
| fForceNo3d | rich text edit control should not have 3d shading |
| fTypeInSysFont | rich text edit control data should be displayed in the system font |
| fEditCall | rich text edit control wants to be notified when first edit occurs |
| fNotify | rich text edit control wants to be notified when focus is first received or lost |
| fVertScroll | enable a vertical scroll bar |
| fTimer | a timer should be used to blink the cursor |

Figure 7:
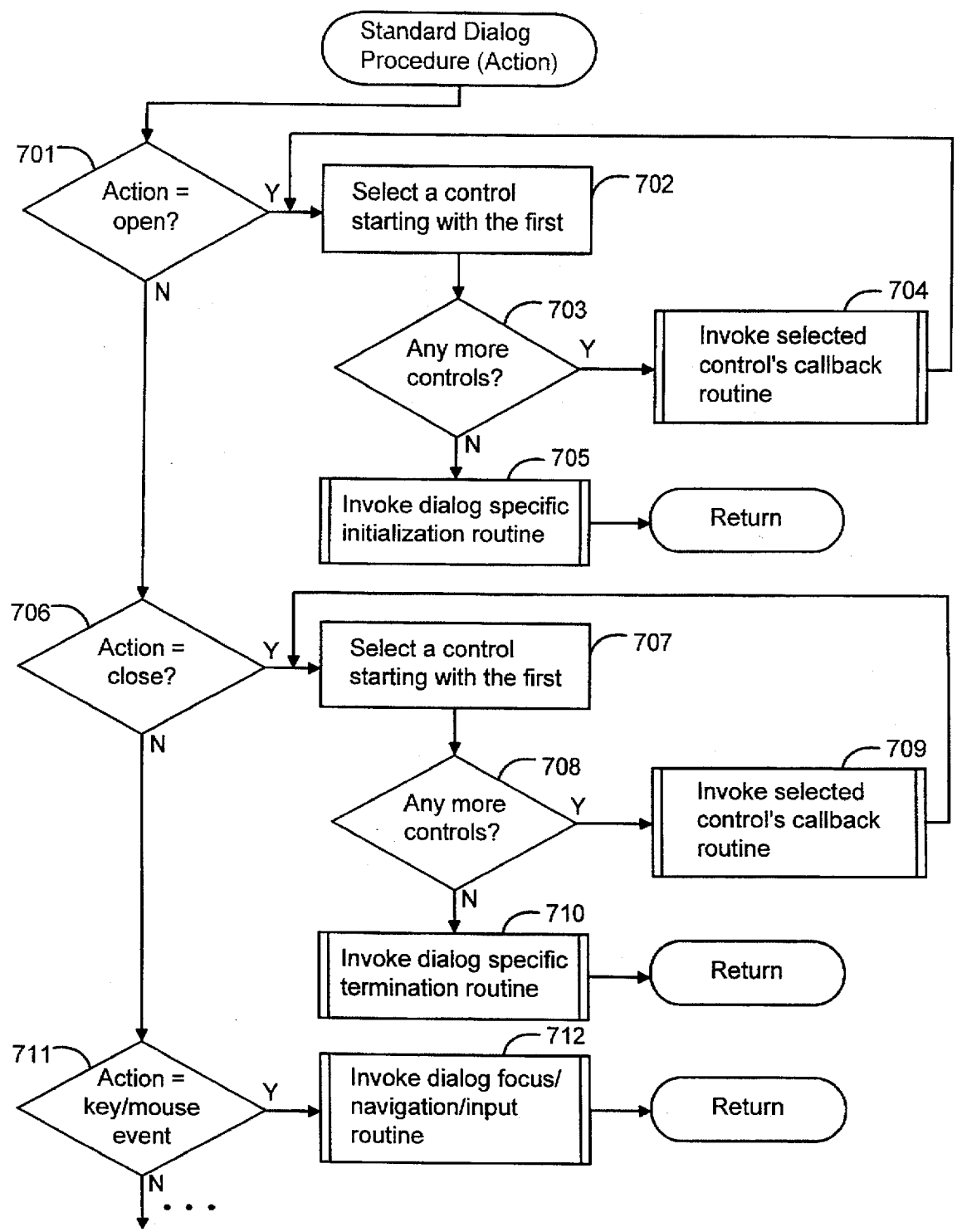
FIG. 7 is a flow diagram of an example standard dialog procedure for a dialog window.

FIG. 7 is a flow diagram of an example standard dialog procedure for a dialog window. The standard dialog procedure is preferably supplied by the underlying word processing environment with hooks to invoke dialog author supplied dialog specific routines. The standard dialog procedure performs different steps depending upon a specified action. When the action specified is to open a dialog window corresponding to the dialog defined in the dialog resource file, steps 701–705 are performed to initialize the dialog. When the action specified is to close the dialog window, steps 706–710 are performed to dispose of created resources and to terminate execution of the standard dialog procedure. When the action specified is a keyboard or a mouse event, step 712 is executed to pass the event to the appropriate dialog procedure routine. Other steps are performed as needed by the dialog procedure as indicated by the ellipses following step 711.

Specifically, in step 701, the dialog procedure determines whether the action specified is to open a dialog window and, if so, continues at step 702, else continues at step 706. In step 702, the dialog procedure performs a loop to invoke the registered callback routine for each control in the dialog resource file starting with the first listed control, to initialize the controls. In step 703, the dialog procedure determines whether there are any more controls to initialize and, if so, continues in step 705, else continues in step 704. In step 704, the dialog procedure invokes the registered callback routine for the current selected control and returns to the beginning of the loop in step 702. In step 705, the dialog procedure invokes the dialog author supplied dialog specific initialization routine for initialization specific to this dialog window, and returns.

In step 706, the dialog procedure determines whether the action specified is to close the dialog window and, if so, continues in step 707, else continues in step 711. In step 707, the dialog procedure performs a loop to invoke the registered callback routine for each control in the dialog window starting with the first control. In step 708, the dialog procedure determines whether there are any more controls to process and, if so, continues in step 709, else continues in step 710. In step 709, the dialog procedure invokes the registered callback routine for the current selected control and returns to the beginning of the loop in step 707. In step 710, the dialog procedure invokes the dialog author supplied termination routine for terminating actions specific to this dialog window to be performed, and returns.

In step 711, the dialog procedure determines whether the action specified is a keyboard or a mouse event and, if so, continues in step 712, else continues with whatever actions the dialog procedure typically performs, as indicated by the ellipses. In one embodiment described earlier, the underlying word processing application program receives keyboard events before the dialog procedure has a chance to process them. In this case, the keyboard events received in step 711 are preferably those that have been passed to the dialog procedure by the keyboard input loop of the underlying word processing application program. Similarly, not all mouse events are received first by the dialog procedure when a user moves the mouse over a dialog control or clicks on a dialog control in the displayed dialog window. Dialog controls that wish to perform certain behaviors upon mouse events typically provide window procedures for handling the mouse events. After dialog control specific processing, these window procedures then pass the mouse events along to the dialog procedure. Hence, when the dialog procedure receives a mouse button down event in step 711, it invokes a routine in step 712 to set the window activation to the dialog window, and returns. Setting the window activation means that the dialog window displays an indication that it is the current window, for example, by changing the title bar color to an active title bar color as is done in Microsoft Windows. In step 712, other routines are invoked as appropriate to the keyboard or mouse event.

Figure 8:
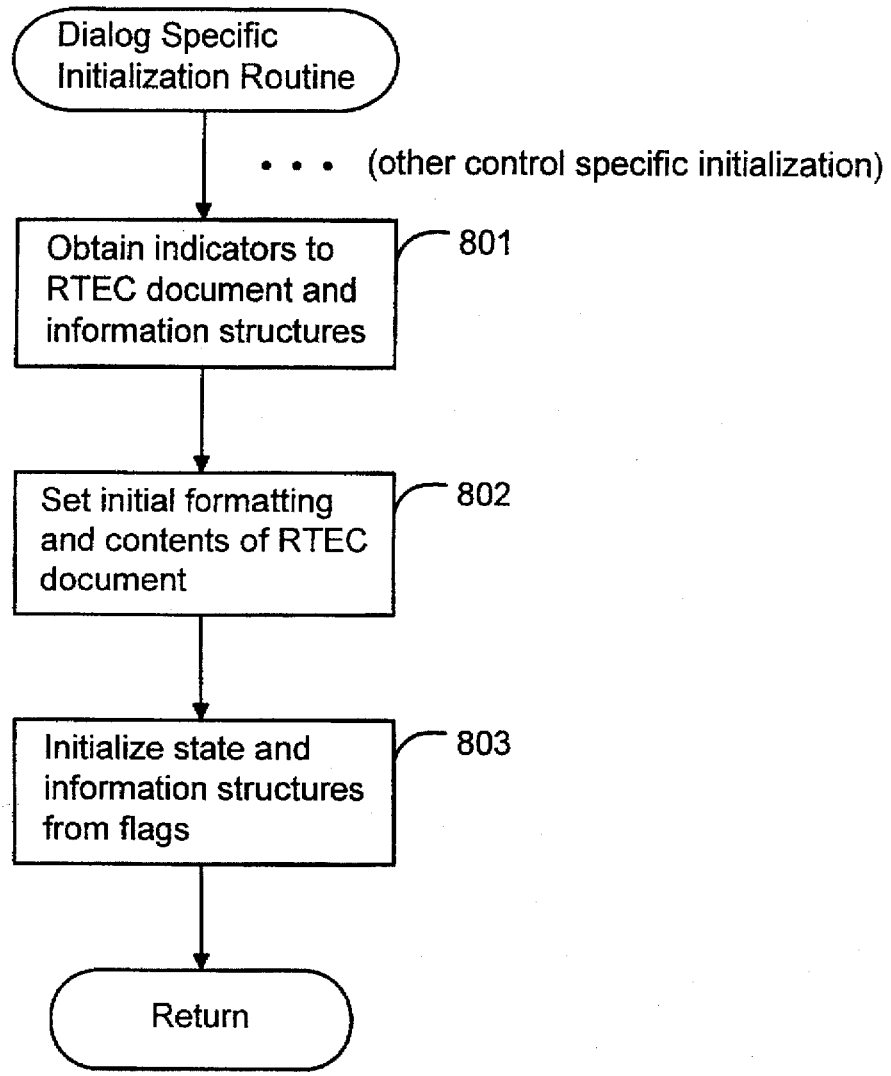
FIG. 8 is a flow diagram of an example dialog specific initialization routine for initializing a rich text edit control.

FIG. 8 is a flow diagram of an example dialog specific initialization routine for initializing a rich text edit control. In addition to any other dialog specific initialization, the dialog author initializes a rich text edit control by obtaining indicators to the information structures and word processing document that are created and associated with the rich text edit control by the registered callback routine (discussed further below), and by initializing the structures and the word processing document. Specifically, in step 801, in addition to any other control specific initialization, the dialog initialization routine obtains indicators to the word processing document associated with the rich text edit control in the dialog window and to the associated information structures for maintaining information concerning the rich text edit control. Although this description refers to the support provided for a single rich text edit control in a dialog window, one skilled in the art will appreciate that each rich text edit control in a dialog is given a unique identification tag and that information is associated with each tag and the same initialization and processing steps are performed for each rich text edit control in the dialog. One skilled in the art will also recognize that alternative implementations are possible, for example, an architecture can be defined where rich text edit control information is stored in a single structure but is indexed by unique rich text edit control identification tags. In step 802, the dialog specific initialization routine sets the initial data contents and formatting characteristics of the data to be displayed in the rich text edit field corresponding to this rich text edit control. In step 803, the dialog specific initialization routine initializes the state of the rich text edit control and the information structures based upon the flags initially specified in the dialog description file, and returns.

Figure 9:
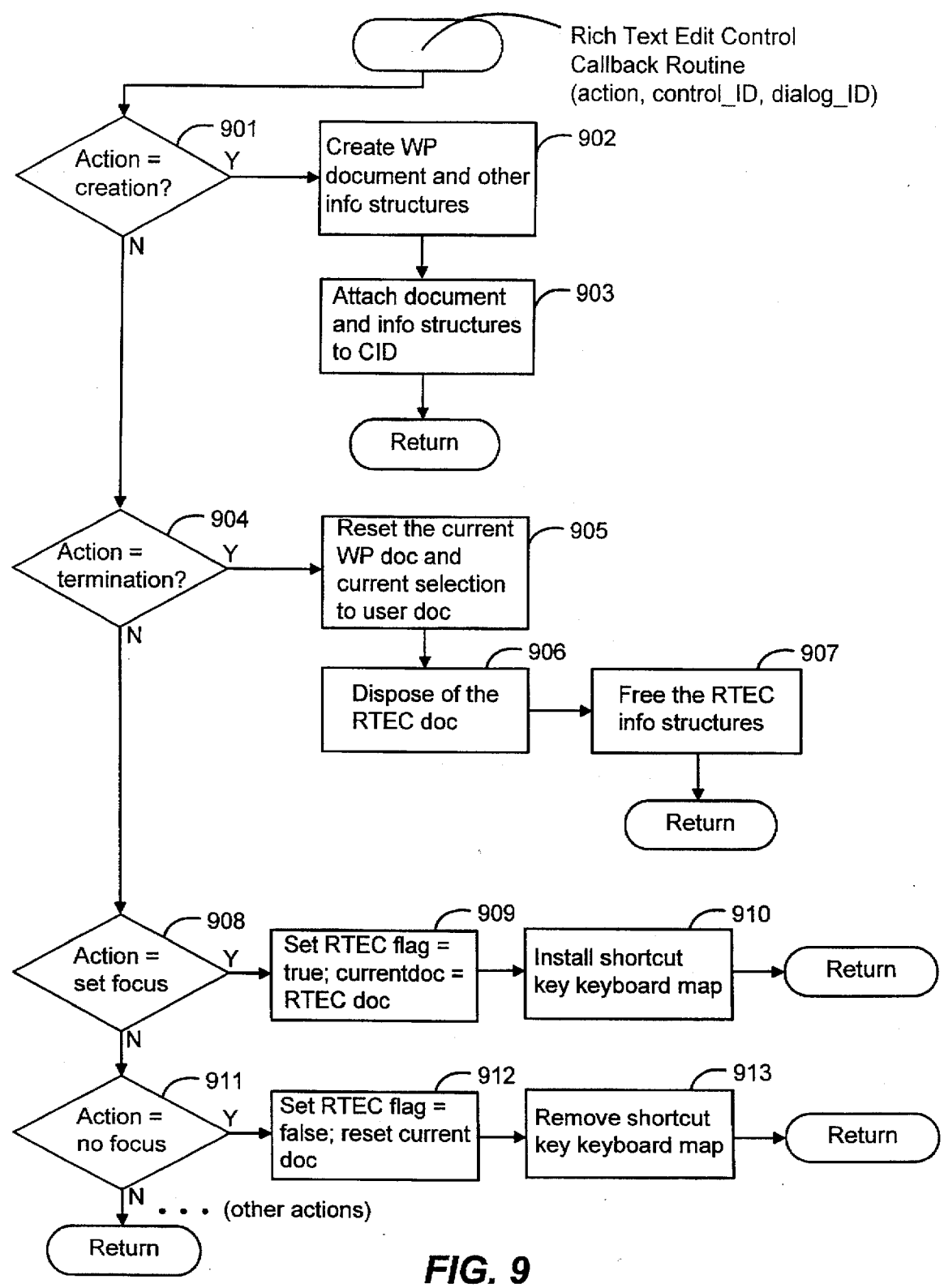
FIG. 9 is a flow diagram of an example rich text edit control callback routine.

FIG. 9 is a flow diagram of an example rich text edit control callback routine. This callback routine is preferably supplied by the underlying word processing application program to implement the rich text edit controls currently displayed. Thus, an indication of the rich text edit control and the dialog window for which the callback was invoked are passed as input parameters to the callback routine. The requested action is also specified as one of the input parameters. The callback routine is organized according to the specified action. In steps 901–903, the callback routine performs steps during the creation of the specified dialog window. In steps 904–907, the callback routine performs steps during termination of the specified dialog window. In steps 908–910, the callback routine responds to a request to give the rich text edit control focus. In steps 911–913, the callback routine responds to a request to remove focus.

Specifically, in step 901, the callback routine determines whether the specified action is creation (opening) of the specified dialog window and, if so, continues in step 902, else continues in step 904. In step 902, the callback routine creates a word processing document to hold the content of the rich text edit control and creates the other information structures needed to represent a word processing document. In step 903, the callback routine associates the created word processing document and information structures to the unique dialog control identification tag specified as an input parameter by calling an underlying word processing application program routine, and returns. In step 904, the callback routine determines whether the specified action is to terminate the specified dialog window and, if so, continues in steps 905–907 to terminate the associated structures, else continues in step 908. Specifically, in step 905, the routine resets the word processing application program's state variables to indicate that the current word processing document and the current user selection is the underlying user document. This step enables the user to resume editing the underlying user document when the dialog window is closed. In step 906, the routine disposes of the rich text edit control word processing document and in step 907 releases the rich text edit control information structures, and returns. In step 908, the callback routine determines whether the specified action is a focus request and, if so, continues in step 909, else continues in step 911. In step 909, the routine sets a flag to inform the underlying word processing program application that the user is currently editing within a rich text edit control. This flag is used within the standard word processing application program routines to detect when the user input should be displayed in a rich text edit field as opposed to the underlying user document. This flag is also used in one embodiment to limit the editing and formatting capabilities offered to the user while editing in a rich text edit control. In step 910, if the specified rich text edit control has requested shortcut key behavior, then the appropriate keyboard map is registered with the underlying word processing application program, and the routine returns. In step 911, the callback routine determines whether the specified action is a request to remove focus and, if so, continues in step 912, else continues with other processing. In step 912, the routine resets the rich text edit flag. In step 913, the routine unregisters the previously registered shortcut key keyboard map. After step 913, the callback routine continues with whatever other actions are processed, and returns.

Figure 10:
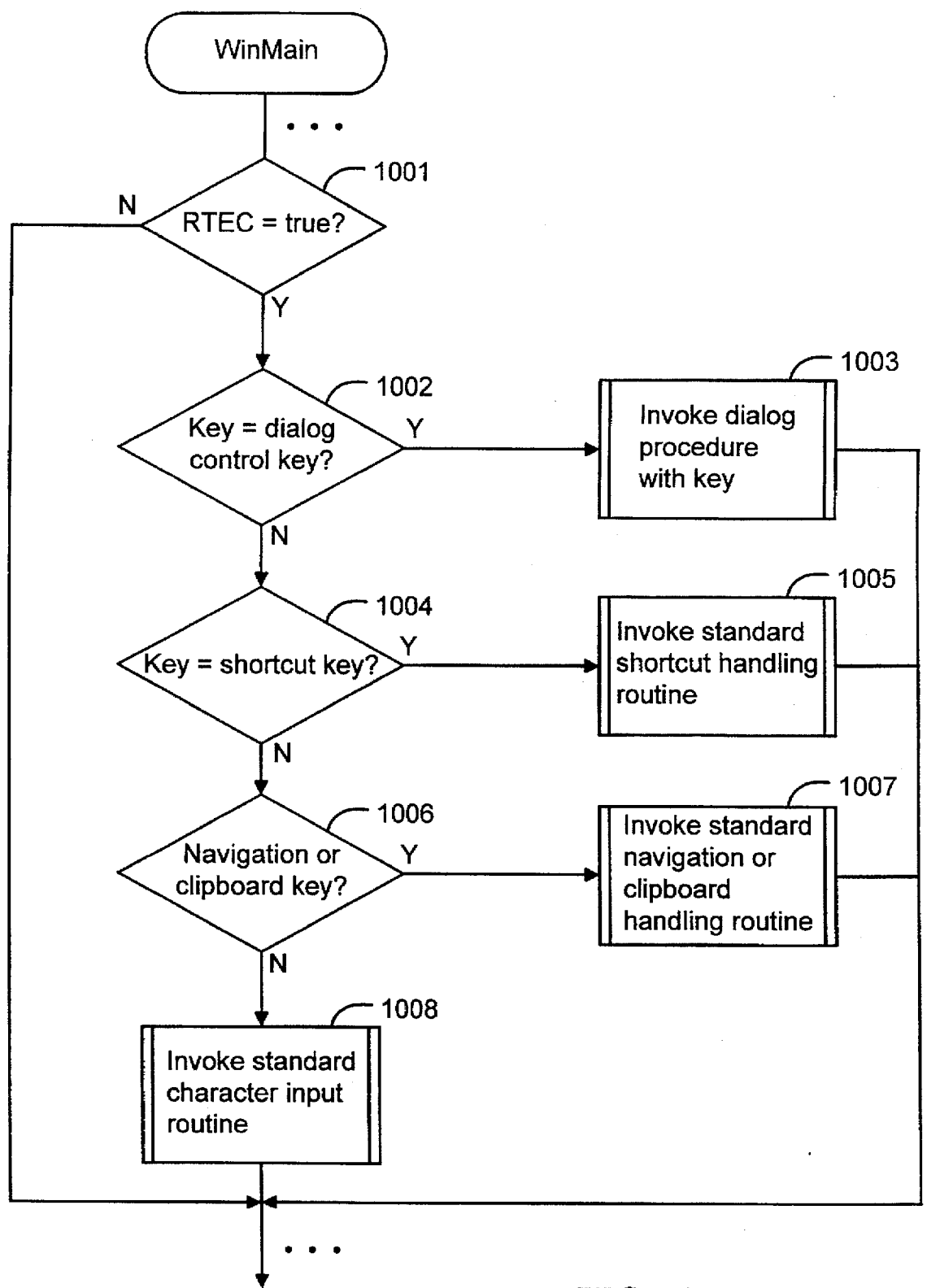
FIG. 10 is a flow diagram of a portion of the main loop of the underlying word processing application program.

FIG. 10 is a flow diagram of a portion of the main loop of the underlying word processing application program, referred to as WinMain. In order to support rich text edit controls, in one embodiment, the steps displayed in FIG. 10 are added to already existing code in the underlying word processing application program. Specifically, code is added to detect whether the user is currently editing a rich text edit control and, if so, a series of steps are performed to decide whether to process the key or to pass it on to the appropriate dialog management code for the currently selected rich text edit control. Otherwise, the routine does other standard processing for editing and formatting user input in a user document.

Specifically, in step 1001, WinMain determines whether the rich text edit control flag is set and, if so, continues in step 1002, else continues with other word processing activity. In step 1002, the routine determines whether the pending keyboard event is a dialog control key and, if so, continues in step 1003, else continues in step 1004. In step 1003, the routine invokes the standard dialog procedure passing along the key and then continues with other word processing activity. (The standard dialog procedure determines which dialog code to invoke based upon retained knowledge of the "current dialog" being edited by the user.) In step 1004, the routine determines whether the pending keyboard event is a shortcut key and, if so, continues in step 1005, else continues in step 1006. In step 1005, the routine invokes the existing shortcut handling routine defined in the word processing application program and then continues with other word processing activity. In step 1006, the routine determines whether the pending keyboard event is a navigation key or a clipboard related key and, if so, continues in step 1007, else continues in step 1008. In step 1007, the routine invokes the existing navigation or clipboard handling routines defined in the word processing application program and then continues with other word processing activity. In step 1008, the routine invokes the existing character input routine provided by the underlying word processing application program to input the character into the rich text edit field and then continues with other word processing activity.

Figure 11:
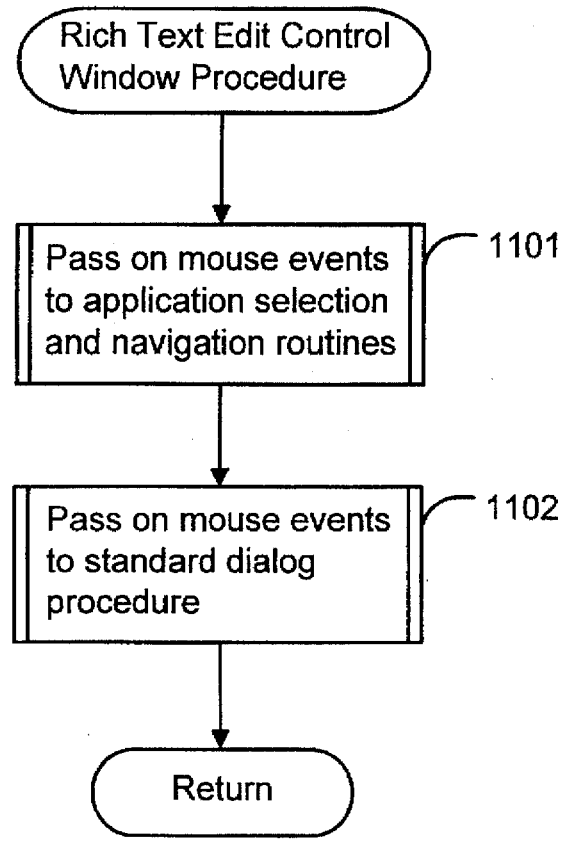
FIG. 11 is a flow diagram of an example window procedure for a rich text edit control.

If, instead of inputting a character, the user clicks with a mouse button on the rich text edit control, then the registered window procedure for the rich text edit control is invoked to handle the mouse event. FIG. 11 is a flow diagram of an example window procedure for a rich text edit control. In step 1101, in response to receiving a mouse event, the window procedure passes the event to the underlying word processing application program's existing selection and navigation routines. In step 1102, the window procedure passes the mouse event on to the standard dialog procedure to enable the current dialog window to respond to window activation, and returns.

Although the present invention has been disclosed and described in terms of preferred embodiments, it is not intended that the invention be limited to such embodiments. Modifications within the spirit of the invention will be apparent to those skilled in the art. The scope of the present invention is defined by the claims which follow.

We claim:

1. A method in a computer system for formatting data in an edit field, the computer system having windows for inputting and displaying data, the method comprising the computer-implemented steps of:

opening a dialog window wherein the dialog window is displayed;

displaying the edit field in the displayed dialog window;

receiving data, directly from a user, to be displayed in the edit field; and without closing the dialog window, displaying the received data in the edit field according to a first format;

selecting a portion of the data displayed in the edit field that is less than the data displayed in the edit field, thereby leaving a remaining portion of unselected data displayed in the edit field;

determining a second format for the selected portion of the data; and re-displaying the selected portion of the data displayed in the edit field according to the determined second format, such that the remaining portion of unselected data continues to be displayed in the edit field unchanged.

2. The method of claim 1 wherein the step of displaying the edit field further comprises the step of displaying initial data in the edit field according to the first format before receiving data from the user.

3. The method of claim 2, the computer system having an application program that supports editing a document, wherein the step of displaying the edit field in the displayed dialog window is performed by the application program, and wherein the step of displaying the initial data displays data that is supplied from the document.

4. The method of claim 1 wherein the step of receiving data from the user further comprises the steps of:

determining a data selection, the data selection being located in a window other than the dialog window; and incorporating the data selection into the edit field.

5. A method in a computer system for formatting data in an edit field, the computer system having windows for inputting and displaying data, the method comprising the computer-implemented steps of:

opening a dialog window, wherein the dialog window is displayed;

displaying the edit field in the displayed dialog window;

determining a first format for displaying data in the edit field; and without closing the dialog window, determining a second format for displaying data in the edit field;

receiving data, directly from a user, to be displayed in the edit field;

selecting a portion of the data displayed in the edit field that is less than the data displayed in the edit field, thereby leaving a remaining portion of unselected data displayed in the edit field; and displaying the selected portion of the data in the edit field according to the determined second format, such that the remaining portion of unselected data continues to be displayed in the edit field unchanged.

6. The method of claim 5 wherein the step of displaying the edit field further comprises the step of displaying initial data in the edit field according to the first format.

7. The method of claim 6, the computer system having an application program that supports editing a document, wherein the step of displaying the edit field in the displayed dialog window is performed by the application program, and wherein the step of displaying the initial data displays data that is supplied from the document.

8. The method of claim 5 wherein the step of receiving data directly from the user further comprises the steps of:
   determining a data selection in a window other than the dialog window; and
   incorporating the data selection into the edit field.

9. The method of claim 5 wherein the computer-implemented steps are performed on an MS-DOS compatible operating system.

10. A method in a computer system for formatting data in an edit field, the computer system having windows for inputting and displaying data, the method comprising the computer-implemented steps of:
   displaying the edit field in an open dialog window;
   displaying data in the edit field according to a first format; and
   without closing the dialog window,
      selecting a portion of the data displayed in the edit field that is less than the data displayed in the edit field, thereby leaving a remaining portion of unselected data displayed in the edit field;
      altering the content of the selected portion of the data;
      determining a second format for displaying the selected portion of the data in the edit field; and
      re-displaying the selected portion of the data in the edit field according to the determined second format, such that the remaining portion of unselected data continues to be displayed in the edit field unchanged.

11. The method of claim 10 wherein the step of determining a second format determines font attributes.

12. The method of claim 10 wherein the step of determining a second format determines paragraph attributes.

13. The method of claim 10, the computer system having an application program that supports editing a document, wherein the step of displaying data in the edit field according to the first format displays data that is supplied from the document.

14. The method of claim 10 wherein the step of determining a second format further comprises the steps of:
   displaying a menu; and
   determining a format selection from the menu.

15. The method of claim 10 wherein the step of altering the content of the selected portion of the data in the edit field further comprises the steps of:
   determining an external data selection, the data selection being located in a window other than the dialog window; and
   incorporating the data selection into the edit field as the altered content.

16. The method of claim 15 wherein the step of incorporating comprises the substep of copying the determined eternal data selection into the edit field.

17. The method of claim 15 wherein the step of incorporating comprises the substep of moving the determined external data selection into the edit field.

18. The method of claim 15 wherein the step of incorporating comprises the substep of linking the determined external data selection into the edit field without copying the external data selection.

19. The method of claim 15, the computer system having a user input device, wherein the step of incorporating comprises the substep of dragging the determined external data selection into the edit field using the user input device.

20. The method of claim 15 wherein the step of incorporating further comprising the substeps of:
   storing an indicator to the determined external data in a clipboard window; and
   using the stored indicator, incorporating the determined external data into the edit field.

21. The method of claim 10, the computer system having a keyboard with a plurality of keys, each key corresponding to a different format, and wherein the step of determining the second format comprises the substeps of:
   in response to a user pressing a key from among the plurality of keys, determining the corresponding format; and
   using the determined format as the second format.

22. The method of claim 10, wherein the step of displaying the edit field in the open dialog window further comprises the step of displaying the edit field with a scroll bar such that the data displayed in the edit field is scrollable.

23. A method in a computer system for formatting data in an edit field, the computer system having windows for inputting and displaying data, the method comprising the computer-implemented steps of:
   opening a dialog window, wherein the dialog window is displayed;
   displaying the edit field in the displayed dialog window;
   determining a data selection, the data selection located in a second window other than the dialog window, the data selection having data in an initial format in the second window;
   incorporating the data from the determined data selection into the edit field, such that the data is displayed according to the initial format; and
   without closing the dialog window,
      selecting a portion of the incorporated data displayed in the edit field that is less than the data displayed in the edit field, thereby leaving a remaining portion of unselected data displayed in the edit field;
      indicating a modified format for displaying the selected portion of the data in the edit field; and
      re-displaying the selected portion of the displayed is incorporated data according to the modified format, such that the remaining portion of unselected data continues to be displayed in the edit field unchanged.

24. A method in a word processor for formatting data from a document, the data having format characteristics, the word processor having a plurality of dialog windows for inputting and displaying data, the method comprising the computer-implemented steps of:
   displaying a dialog window from amongst the plurality of dialog windows to change a format characteristic of a selection of data from a portion of the document;
   displaying an edit field in the displayed dialog window with the edit field initially displaying the selection of data from a portion of the document; and
   without closing the dialog window,
      determining a modified format characteristic for the selection of data from the portion of the document that is displayed in the edit field; and
      displaying the selection of data displayed in the edit field according to the modified format.

25. The method of claim 24, further comprising the step of, when the dialog window is closed, displaying the selection of data in the document according to the modified format.

26. A method in a computer system for entering formatted data into a document, the method comprising the computer-implemented steps of:

displaying a dialog with a plurality of fields for entering data, each field having an edit control for managing inputting and formatting data in the field;

receiving data from a user;

displaying data in a selected one of the plurality of fields according to an initial format;

without closing the dialog, indicating to the edit control of the selected field a modified format for displaying a determined portion of the data in the selected field that is less than the data displayed in the selected field, thereby leaving a remaining portion; and under control of the edit control of the selected field, displaying the determined portion of the data in the selected field according to the modified format; and incorporating into the document the data displayed in the selected field with the determined portion according to the modified format and the remaining portion in the initial format.

27. A computer system for inputting and formatting data, the computer system comprising:

an edit field for containing data;

a dialog window having a display region that, in response to being opened, displays the edit field in the display region;

a first format indication mechanism that, in response to being invoked, indicates an initial format for data to be contained in the edit field;

a data input mechanism that,
opens the dialog window,
invokes the first format indication mechanism to indicate the initial format
receives and inputs data into the displayed edit field, and
displays the data contained in the displayed edit field according to the initial format; and a format modification mechanism that, without closing the dialog window,
modifies the format of a selected portion of the data contained in the displayed edit field that is less than the data contained in the displayed edit field, thereby leaving a remaining portion of unselected data contained in the displayed edit field, and
causes the selected portion of the data contained in the displayed edit field to be re-displayed according to the modified format, such that the remaining portion of unselected data continues to be displayed in the edit field unchanged.

28. A computer system for inputting and formatting data, the computer system comprising:

edit field having means for containing data;

a dialog window having means for displaying the edit field, the dialog window having a display region and that, in response to being opened, causes the dialog window display means to display the edit field in the display region;

means for indicating an initial format that, in response to being invoked, indicates the initial format for data to be contained in the edit field;

means for receiving and inputting data that
opens the dialog window,
invokes the means for indicating the initial format to indicate the initial format,
receives and inputs data into the displayed edit field, and
invokes the dialog window display means to display the data contained in the displayed edit field; and format modifying means that, without closing the dialog window,
modifies the format of a selected portion of the data contained in the displayed edit field that is less than the data contained in the displayed edit field, thereby leaving a remaining portion of unselected data contained in the displayed edit field, and
invokes the dialog window display means to display the selected portion of the data in the displayed edit field according to the modified format, such that the remaining portion of unselected data continues to be displayed in the edit field unchanged.

29. A computer system for inputting and formatting data, the computer system comprising:

an edit field for containing data;

a dialog window having a display region that, in response to being opened, displays the edit field in the display region;

a second window having data in an initial data format;

a data selection mechanism that, in response to being invoked, selects a portion of the data in the second window;

an incorporation mechanism that
opens the dialog window,
invokes the data selection mechanism to obtain the selected data in the initial format,
incorporates the selected data into the displayed edit field according to the initial format of the selected data, thereby causing the incorporated data to be contained in the displayed edit field, and
displays the contained data; and a format modification mechanism that, without closing the dialog window,
modifies the format of a selected portion of the data contained in the displayed edit field that is less than the data contained in the displayed edit field, thereby leaving a remaining portion of unselected data contained in the displayed edit field, and
re-displays the data in the displayed edit field according to the modified format, such that the remaining portion of unselected data continues to be displayed in the edit field unchanged.

30. A method in a computer system for formatting data in a portion of a window, the computer system having windows for inputting and displaying data, the method comprising the computer-implemented steps of:

opening a dialog window, wherein the dialog window is displayed;

displaying an edit field in the displayed dialog window;

determining a first paragraph format for displaying data in the edit field that defines characteristics of data other than font characteristics; and without closing the dialog window,
determining a second paragraph format for displaying data in the edit field that defines characteristics of data other than font characteristics;
receiving data to be displayed in the edit field; and
displaying the received data in the edit field according to the determined second paragraph format.

31. The method of claim 30 wherein the first paragraph format and second paragraph format define line spacing.

32. The method of claim 30 wherein the first paragraph format and second paragraph format define paragraph indentation.

33. The method of claim 30 wherein the first paragraph format and second paragraph format define text flow.

34. A computer-readable memory medium containing instructions for controlling a computer processor in a computer system to format data in an edit field, the computer system having windows for inputting and displaying data, by performing the steps of:

opening a dialog window, wherein the dialog window is displayed;

displaying the edit field in the displayed dialog window;

receiving data, directly from a user, to be displayed in the edit field; and without closing the dialog window,
displaying the received data in the edit field according to a first format;
selecting a portion of the data displayed in the edit field that is less than the data displayed in the edit field, thereby leaving a remaining portion of unselected data displayed in the edit field;
determining a second format for the selected portion of the data; and
re-displaying the selected portion of the data displayed in the edit field according to the determined second format, such that the remaining portion of unselected data continues to be displayed in the edit field unchanged.

35. A computer-readable memory medium containing instructions for controlling a word processor to format data from a document, the data having format characteristics, the word processor having a plurality of dialog windows for inputting and displaying data, by performing the steps of:

displaying a dialog window from amongst the plurality of dialog windows to change a format characteristic of a selection of data in the document;

displaying an edit field in the displayed dialog window with the edit field initially displaying the selection of data; and without closing the dialog window,
determining a modified format characteristic for the data displayed in the edit field; and
displaying the data in the edit field according to the modified format.

36. A computer-readable memory medium containing instructions for controlling a computer processor in a computer system to format data in an edit field, the computer system having windows for inputting and displaying data and having an application program that supports editing, the application program providing an edit control for implementing the behavior of the edit field, by performing the steps of:

opening a dialog window, wherein the dialog window is displayed;

displaying the edit field in the displayed dialog window;

receiving data, directly from a user, to be displayed in the edit field; and without closing the dialog window,
displaying the received data in the edit field according to a first format;
determining a second format; and
using the edit control, re-displaying the received data displayed in the edit field according to the determined second format.

37. A computer-readable memory medium containing instructions for controlling a computer processor to implement a rich text edit field in a dialog window, the computer system having an application program having code for inserting and displaying data in document structures, by performing the steps of:

creating a dialog window;

allocating space in the dialog window for the rich text edit field;

allocating a document structure for storing data that is placed in the rich text edit field;

associating the allocated document structure with the rich text edit field;

initializing the allocated document structure according to initial format characteristics;

displaying the dialog window with the rich text edit field;

in response to receiving user input of data for the rich text edit field, invoking the code for inserting and displaying data; and under control of the invoked code for inserting and displaying data, inserting the received data in the allocated document structure associated with the rich text edit field, such that the received data is displayed in the rich text edit field according to the initial format characteristics.

* * * * *

UNITED STATES PATENT AND TRADEMARK OFFICE
CERTIFICATE OF CORRECTION

PATENT NO. : 5,694,610

DATED : December 2, 1997

INVENTOR(S) : CATHERINE L. HABIB and STEVEN BUSH

It is certified that error appears in the above-identified patent and that said Letters Patent is hereby corrected as shown below:

In column 16, line 43, claim 23, after "displayed", please delete [is]

In column 18, line 61, claim 30, please delete [dosing] and insert in place thereof —closing—

Signed and Sealed this

Twenty-third Day of March, 1999

Attest:

Q. TODD DICKINSON

Attesting Officer

Acting Commissioner of Patents and Trademarks